United States Patent
Unterlander et al.

(10) Patent No.: US 6,951,452 B2
(45) Date of Patent: Oct. 4, 2005

(54) COOLING STATION FOR POST MOLD COOLING OF PLASTIC PIECES

(75) Inventors: Richard M. Unterlander, Holland Landing (CA); Witold Neter, Newnan, GA (US); Zbigniew Romanski, Mississauga (CA); Robin A. Arnott, Alliston (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 10/958,108

(22) Filed: Oct. 5, 2004

(65) Prior Publication Data

US 2005/0042324 A1 Feb. 24, 2005

Related U.S. Application Data

(62) Division of application No. 10/147,360, filed on May 17, 2002, now Pat. No. 6,817,855.

(51) Int. Cl.⁷ .......................... B29C 45/72; B29C 45/78
(52) U.S. Cl. ........................ 425/145; 425/526; 425/534; 425/547; 425/445
(58) Field of Search .................... 425/145, 526, 425/534, 547, 445, 446

(56) References Cited

U.S. PATENT DOCUMENTS

| | | | |
|---|---|---|---|
| 4,449,913 A | 5/1984 | Krishnakumar et al. | 425/548 |
| 4,729,732 A | 3/1988 | Schad et al. | 425/526 |
| 4,836,767 A | 6/1989 | Schad et al. | 425/552 |
| RE33,237 E | 6/1990 | Delfer, III | 425/547 |
| 4,950,152 A | 8/1990 | Brun, Jr. et al. | 425/533 |
| 5,447,426 A | 9/1995 | Gessner et al. | 425/436 R |

(Continued)

FOREIGN PATENT DOCUMENTS

| | | | |
|---|---|---|---|
| EP | 0 794 045 A1 | 9/1997 | B29C/45/04 |
| EP | 0 900 135 B1 | 3/1999 | B29C/45/72 |

OTHER PUBLICATIONS

Busak & Shamban, "Description", Quad–Ring®Seal Brochure, p. 2.
Busak & Shamban, "Applications", Quad–Ring®Seal Brochure, p. 3.
Busak & Shamban, "Materials", Quad–Ring®Seal Brochure, p. 4.
Busak & Shamban, "Methods of Installation of QUAD–RING®Seals", Quad–Ring®Seal Brochure, p. 5.
Busak & Shamban, "QUAD–RING®Seal for Rotary Application", Quad–Ring®Seal Brochure, p. 6.
Busak & Shamban, "Lead–in Chamfers", Quad–Ring®Seal Brochure.
Busak & Shamban, "Description", Kantseal Brochure, p. 2.
Busak & Shamban, "Method of Operation", Kantseal Brochure.

Primary Examiner—Tim Heitbrink
(74) Attorney, Agent, or Firm—Katten Muchin Rosenman

(57) ABSTRACT

Method and apparatus for cooling molded plastic pieces preferably includes a take out structure/step configured to hold the plurality of plastic parts oriented such that closed ends thereof are disposed toward an inside of the take out structure and open ends thereof are disposed toward an outside of the take out structure. A movement structure/step is configured to cause relative movement between the take out structure and at least one of a first cooling station and a second cooling station. The first cooling station includes a first cooling structure/step configured to provide a cooling fluid to an inside of the plurality of plastic parts through the open ends thereof. The second cooling station includes a second cooling structure/step configured to provide a cooling fluid to an inside of the plurality of plastic parts through the open ends thereof.

6 Claims, 41 Drawing Sheets

U.S. PATENT DOCUMENTS

| | | | |
|---|---|---|---|
| 5,514,309 A | 5/1996 | Williamson et al. | 264/37 |
| 5,679,306 A | 10/1997 | Nakajima et al. | 264/520 |
| 5,728,409 A | 3/1998 | Schad et al. | 425/130 |
| 5,750,162 A | 5/1998 | Schad et al. | 425/533 |
| 5,817,345 A | 10/1998 | Koch et al. | 425/130 |
| 5,830,404 A | 11/1998 | Schad et al. | 264/297.2 |
| 6,059,557 A | 5/2000 | Ing et al. | 425/552 |
| 6,113,834 A | 9/2000 | Kozai et al. | 264/335 |
| 6,123,538 A | 9/2000 | Kutalowski | 425/552 |
| 6,143,225 A | 11/2000 | Domodossola et al. | 264/237 |
| 6,168,416 B1 | 1/2001 | Galt | 425/556 |
| 6,171,541 B1 | 1/2001 | Neter et al. | 264/328.14 |
| 6,312,248 B2 * | 11/2001 | Lopez | 425/526 |
| 6,422,855 B1 | 7/2002 | Dubuis et al. | 425/526 |

* cited by examiner

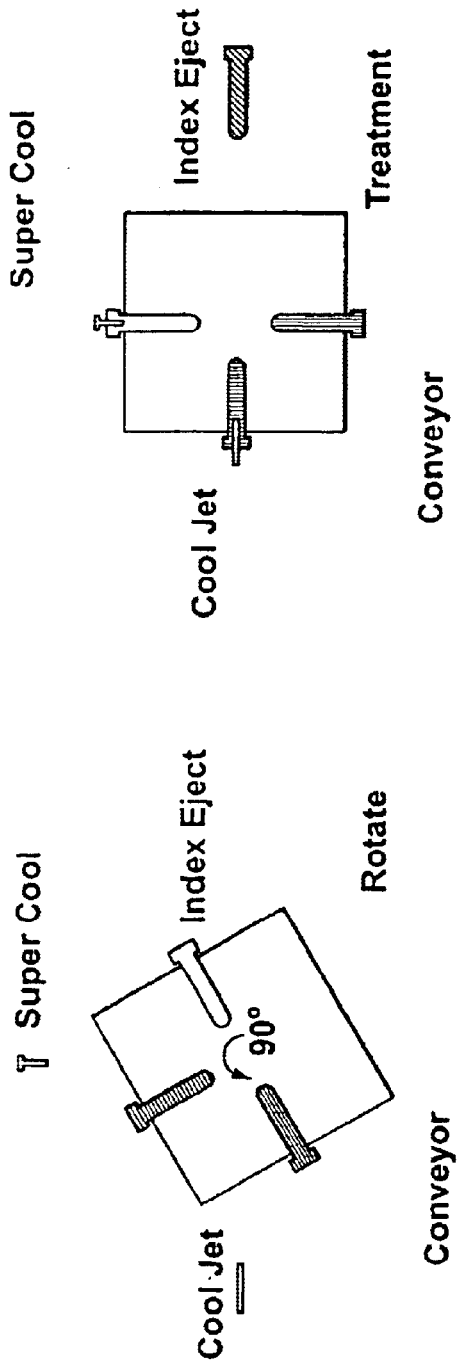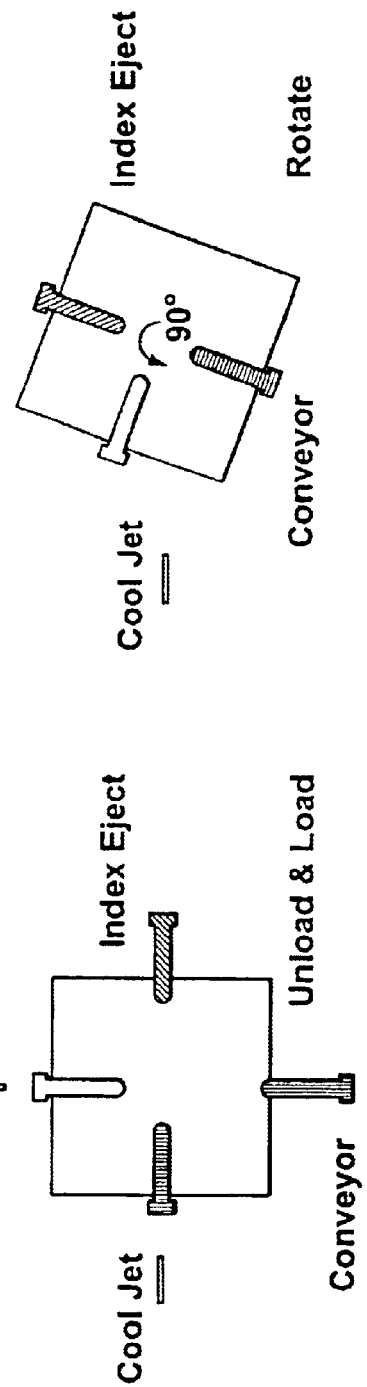
FIG. 12e
FIG. 12f
FIG. 12g
FIG. 12h

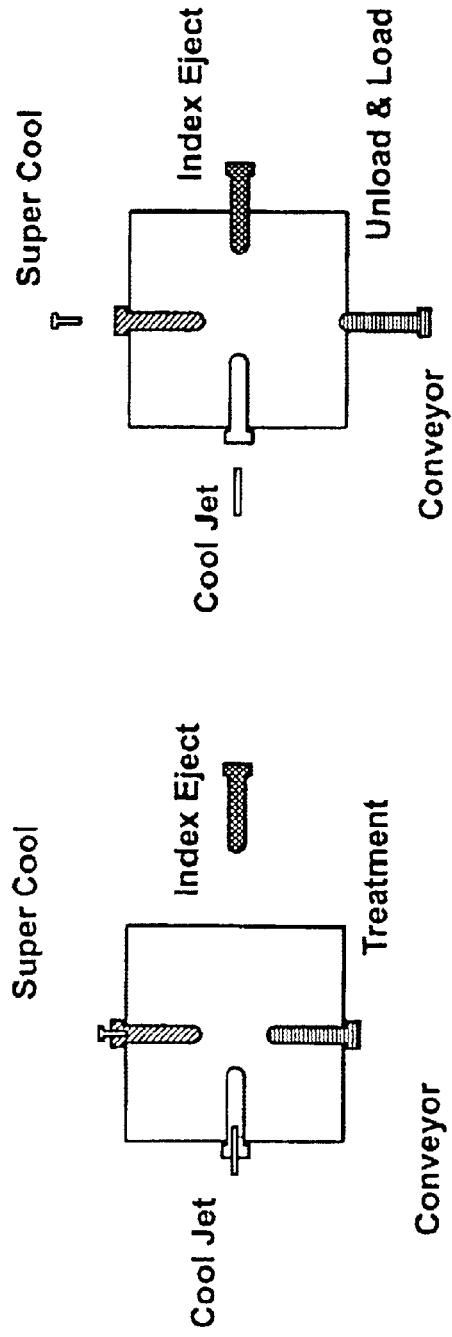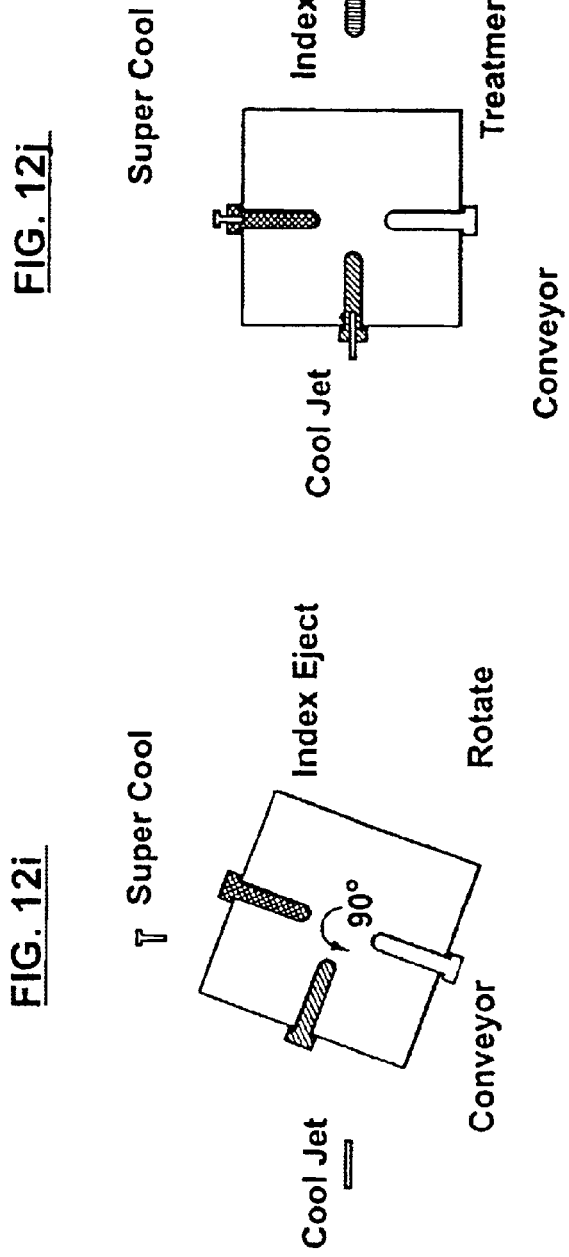

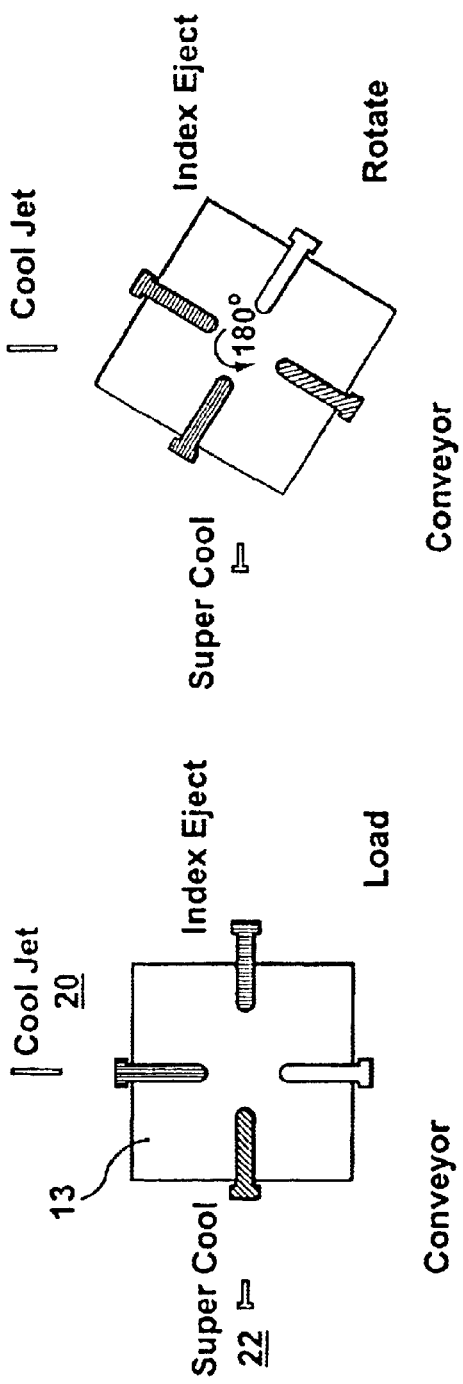
FIG. 18a
FIG. 18b
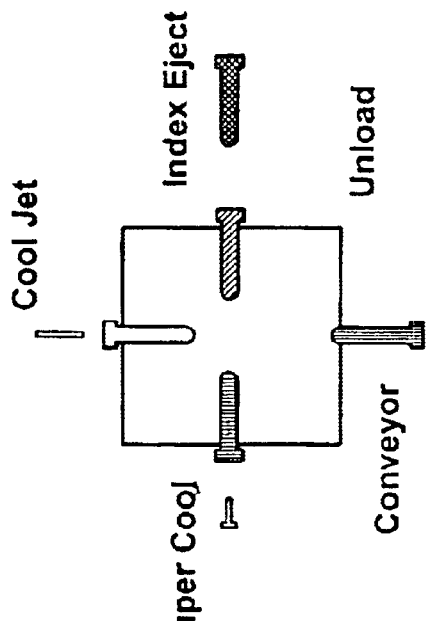
FIG. 18c
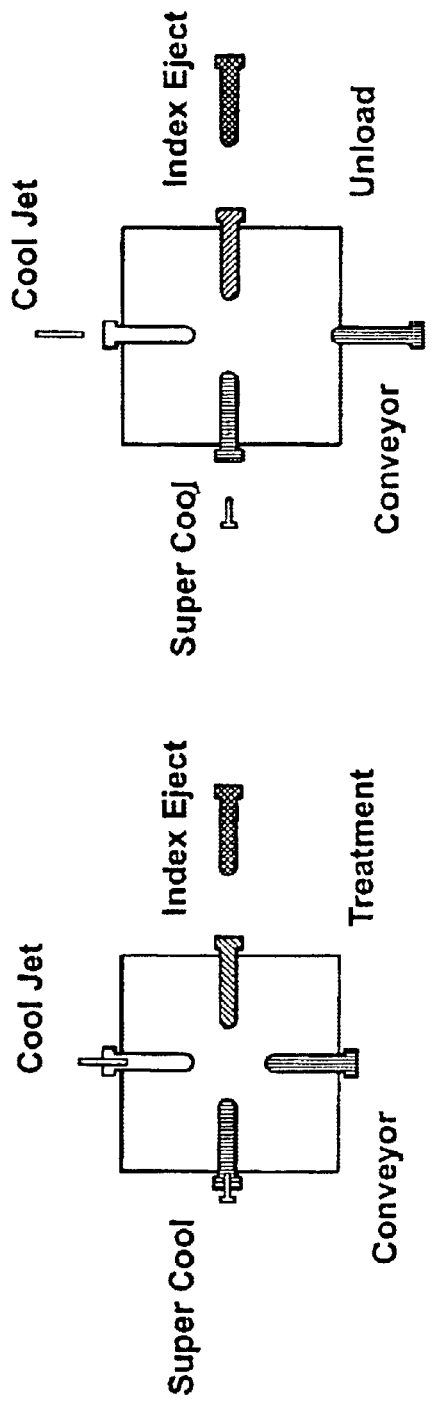
FIG. 18d

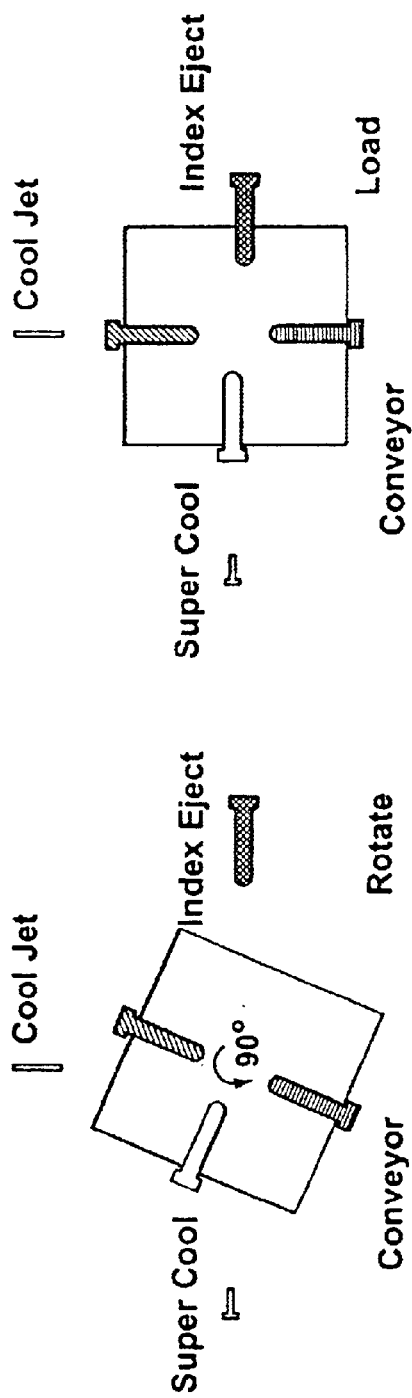
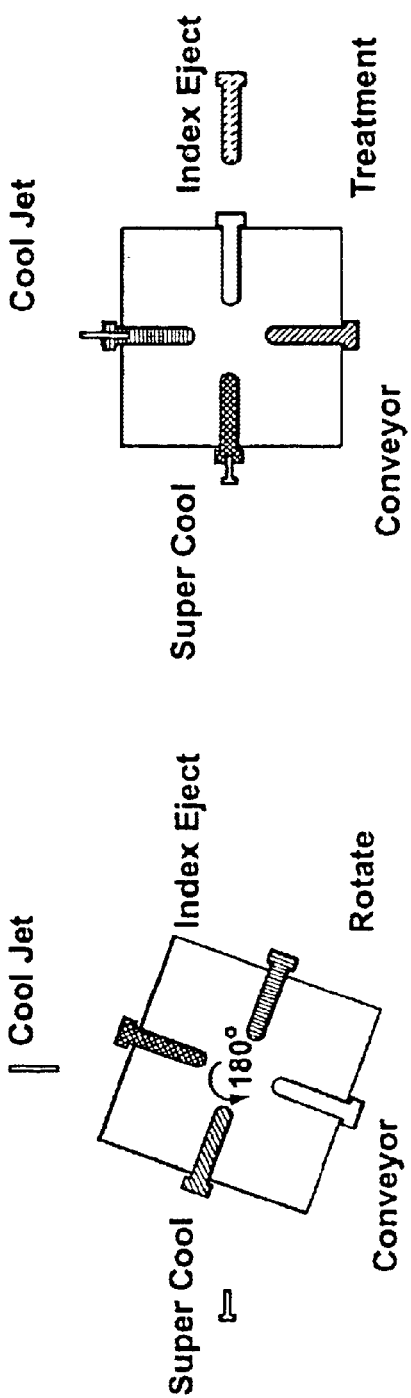
FIG. 18e
FIG. 18f
FIG. 18g
FIG. 18h

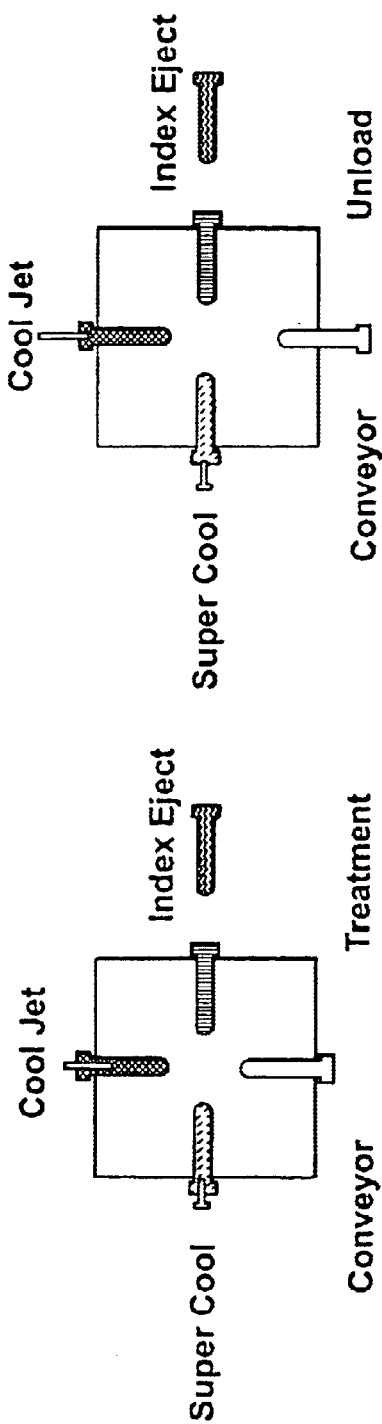
FIG. 18m
FIG. 18n
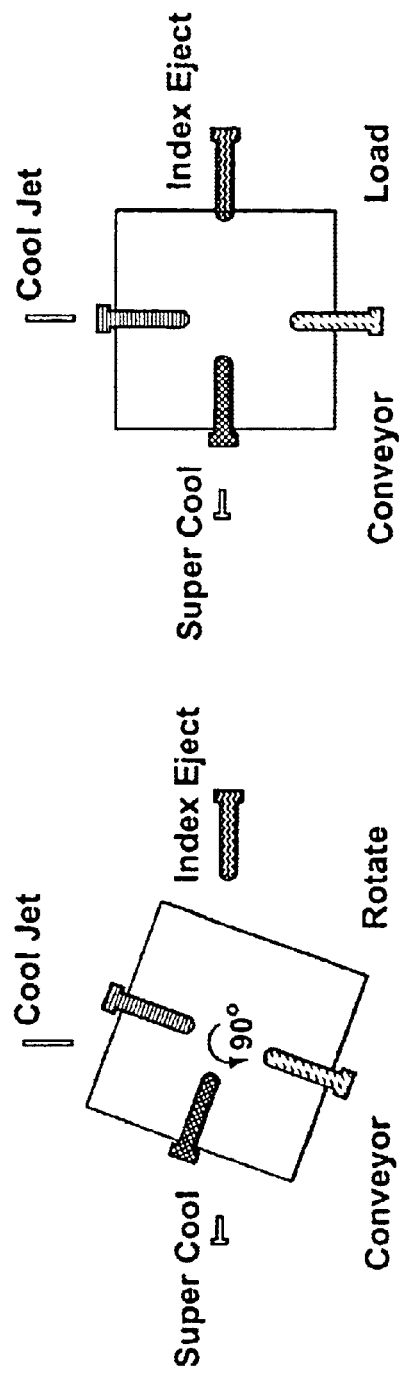
FIG. 18o
FIG. 18p

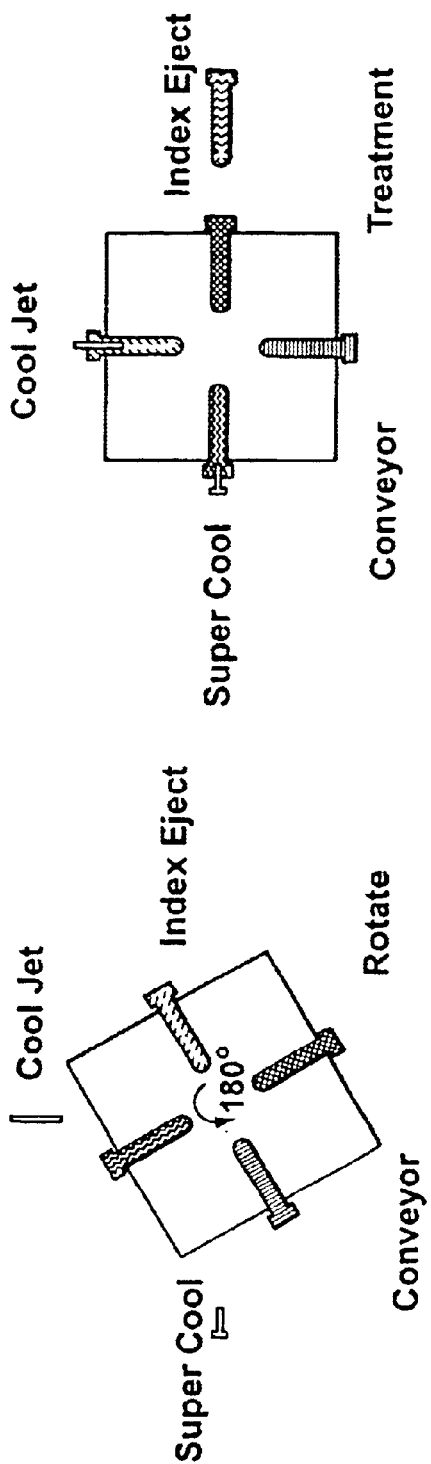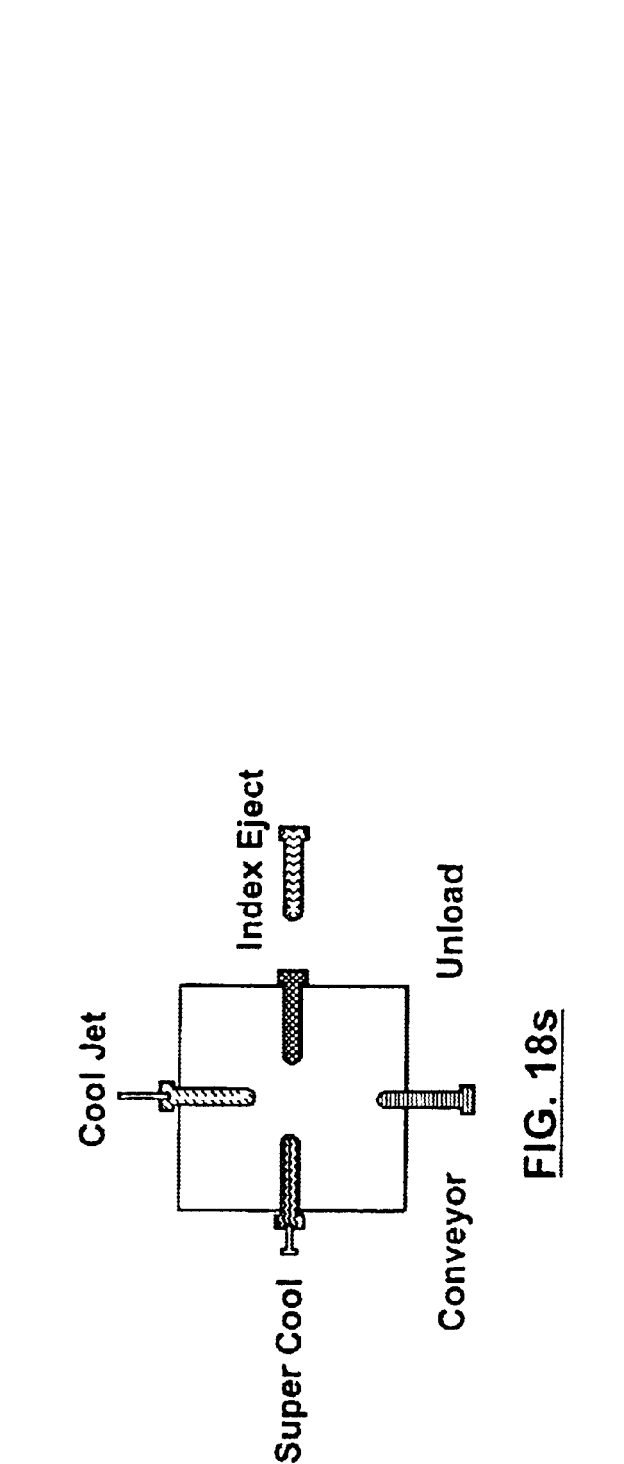
FIG. 18g
FIG. 18r
FIG. 18s

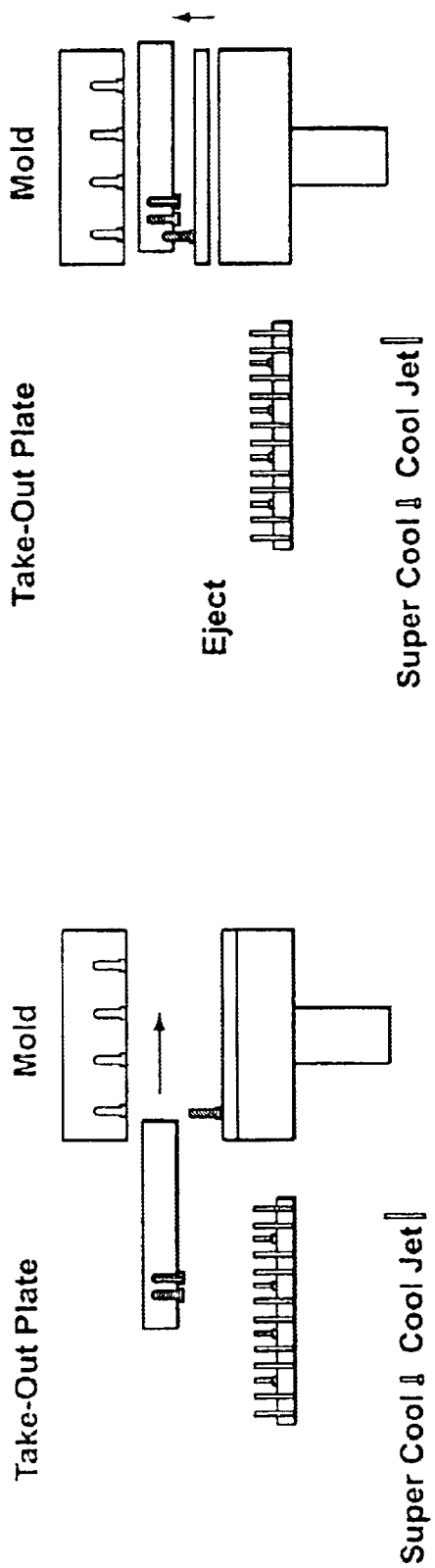
FIG. 32b
FIG. 32a
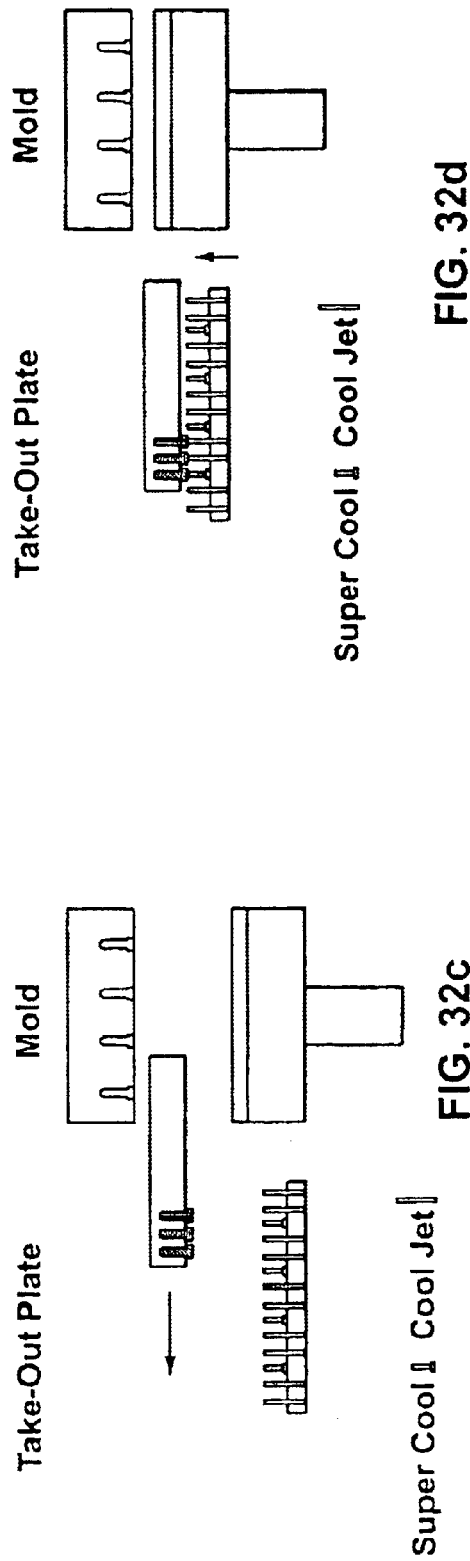
FIG. 32d
FIG. 32c

COOLING STATION FOR POST MOLD COOLING OF PLASTIC PIECES

This is a divisional application of application Ser. No. 10/147,360, filed May 17, 2002 now U.S. Pat. No. 6,817,855. The entire text of the above-referenced disclosure is specifically incorporated by reference herein without disclaimer.

BACKGROUND OF THE INVENTION

1. Field of the Invention

The present invention relates to method and apparatus for cooling molded plastic pieces after the molding is finished. In particular, the present invention relates to method and apparatus for post mold cooling of plastic pieces wherein at least two cooling stations are provided to cool the interior of the plastic pieces. The present invention also relates to method and apparatus wherein pressurized sealing of each plastic piece is carried out at a cooling station such that the pressure seal does not contact the plastic piece. The present invention also relates to method and apparatus wherein plastic piece cavity tubes are provided with vents to prevent deformation of negative draft plastic pieces. Preferably, the plastic pieces comprise plastic preforms.

2. Related Art

A variety of post mold cooling methods are currently employed on injection molding machines (e.g., an Index machine platform) in various sequences to optimize the cooling of freshly molded plastic parts. Some parts (for example plastic preforms) are typically injection-molded using PET resin, and can have wall thicknesses varying from about 2.00 mm to greater than 4,00 mm, and consequently require extended cooling periods to solidify into defect-free parts. Heavy walled parts (such as these made from a material that has a high resistance to thermal heat transfer, like plastic resin) can exhibit a "reheating" phenomena that can produce defective parts after they have been ejected from the mold.

In the case of PET performs some of these manufacturing defects are:

Crystallinity: The resin recrystallizes due to the elevated temperature of the core resin not cooling quickly enough. The white appearance of the crystals impairs the clarity of the final product.

Surface blemishes: The ejected performs, initially having solidified surfaces are reheated by the core material which causes the surface to soften and be easily marred. Sometimes this surface reheating can be severe enough to cause touching parts to weld together.

Geometric inaccuracies: Handling partly-cooled performs or attempting to further cool them in devices that do not maintain their geometric shape while their surfaces are reheated can cause the preform's round diameter to become oval shaped or the smooth surface to become wrinkled or non-linear.

The above-noted problems could be alleviated somewhat by extending the cooling time of the injection molded performs. However, this will cause the injection molding cycle to be lengthy, typically 25 seconds or longer, wherein the majority of this time was used solely for cooling purposes. In an effort to improve the production efficiency of this process, several techniques are employed to perform a "post mold cooling" function, wherein partially-cooled performs are ejected from the injection mold after an initially cooled surface skin has formed to allow the part to be ejected without deformation. The partially-cooled performs are then handed off to a downstream device that continues to hold the perform while removing the remaining heat so that the preform can subsequently be handled without damage. Typically, the preform surface temperature needs to be lowered to about 72° C. to ensure safe handling.

The early ejection of partially-cooled performs released the injection molding equipment earlier in the molding cycle, thereby significantly improving the production efficiency of the equipment. Injection molding cycle times typically were halved from 25 seconds to about 12 seconds or less in some instances depending on the perform design being molded.

Some examples of post mold cooling technology are shown in U.S. Pat. Nos.: 4,729,732; Re. 33,237; 5,447,426; and 6,171,541, the contents of each being incorporated herein by reference.

Another approach to extending the cooling time for performs is to utilize a turret molding machine in which more than one set of injection molding cores are employed. An example is the Index machine, shown in U.S. Pat. Nos.: 5,728,409; 5,830,404; 5,750,162; and 5,817,345 (the contents of each being incorporated herein by reference), which teach using a turret block having four faces and four core sets that are sequentially mated with one cavity set to hold the injection mold performs. Preforms molded on this kind of equipment can be produced in molding cycle times of typically 10–13 seconds.

A disadvantage of the above-described approach is the cost of the additional core side tooling that is required. In order to reduce this cost, Index machines with fewer core side tooling sets were employed. However, to maintain the cycle times, additional post mold cooling devices are needed to complete the perform cooling. Examples of Index machines with post mold cooling devices are shown in U.S. Pat. Nos.: 6,059,557; 6,123,538; 6,143,225; and 6,113,834, the contents of each being incorporated herein by reference.

One technique for improving the rate of heat transfer from a cooling perform is to pressurize its interior volume while cooling it in a cavity. This method helps keep the preform's exterior surface in contact with the cooling cavity surface, and counters the shrinkage of the perform which tends to separate the two surfaces. This allows good heat transfer to be maintained. Examples of pressurized perform cooling are shown in U.S. Pat. Nos.: 4,950,152; and 5,679,306, and in EP 0 900 135, the contents of each being incorporated herein by reference.

Therefore, there is a need for post-mold cooling method and apparatus, which provides rapid, efficient cooling while further reducing the molding cycle time to further decrease the cost of producing molded plastic pieces.

SUMMARY OF THE INVENTION

It is an object of the present invention to provide post-mold cooling method and apparatus for efficiently cooling molded plastic pieces.

According to a first aspect of the present invention, structure and/or steps are provided for cooling a plurality of plastic parts whereby a take out structure/step is configured to hold the plurality of plastic parts oriented such that closed ends thereof are disposed toward an inside of the take out structure and open ends thereof are disposed toward an outside of the take out structure. A movement structure/step is configured to cause relative movement between the take out structure and at least one of a first cooling station and a second cooling station. The first cooling station includes a first cooling structure/step configured to provide a cooling fluid to an inside of the plurality of plastic parts through the open ends thereof. The second cooling station includes a second cooling structure/step configured to provide a cooling fluid to an inside of the plurality of plastic parts through the open ends thereof.

According to a second aspect of the present invention, structure and/or steps are provided for post-mold cooling of a matrix of plastic preforms whereby a take out plate includes a first plurality of receiving tubes configured to receive a first plurality of plastic preforms, and a second plurality of receiving tubes configured to receive a second plurality of plastic preforms. At least one of the first and second plurality of receiving tubes is configured to cool outside surfaces of the corresponding plurality of plastic preforms. A movement structure/step is configured to provide relative movement between the take out plate and first and second cooling stations. The first cooling station includes (i) a plurality of injector devices, each of which is configured to inject a pressurized cooling medium to an interior of a corresponding plastic preforms, and (ii) a plurality of sealing devices, each of which is configured to provide a pressure seal between the injected pressurized cooling medium and a lower, ambient pressure. The second cooling station includes (i) a plurality of cooling pins, each of which is configured to direct a cooling medium at a tip of an inside of a corresponding plastic preform so that the directed cooling medium flows down an inside surface of the corresponding plastic preform and is exhausted to an outside of the take out plate. A control structure/step causes the movement structure/step to move the plurality of plastic preforms from the first cooling station to the second cooling station.

According to a third aspect of the present invention, plastic injection molding structure and/or steps include a plastic molding unit/process having a plurality of mold cavities and a plurality of carriers configured to provide a plurality of plastic parts. A take out device/process removes the plurality of plastic parts from the plastic molding unit/process. A movement structure/process is configured to cause relative movement between the take out device/process and at least one of a first cooling station and a second cooling station. The first cooling station includes a first cooling structure/process configured to seal a pressurized cooling fluid on an interior of each of the plurality of plastic parts. The second cooling station includes a second cooling structure/process configured to provide a cooling fluid to an inside of the plurality of plastic parts.

According to a fourth aspect of the present invention, structure and/or steps are provided for post-molding cooling a plurality of plastic parts whereby a take out stage takes a plurality of plastic parts from a molding machine, the take out stage including a plurality of receiver tubes adapted to receive the plurality of plastic parts such that an open end of each preform is exposed. A plurality of cooling stations are coupled to the take out stage, each cooling station having a plurality of cooling pins for injecting a cooling fluid into an interior of corresponding plastic parts through the exposed ends.

According to a fifth aspect of the present invention, structure and/or steps are provided for a plastic preform cooling station including a holder for holding a plurality of plastic parts such that their open ends are exposed. A plurality of cooling pins are provided for injecting a cooling medium into the exposed ends of the plurality of plastic parts. Sealing structure is provided for sealing the exposed ends of the plurality of plastic parts from ambient pressure. A controller is provided for causing the sealing structure and the plurality of cooling pins to inject cooling air into the plurality of plastic parts and maintain pressure therein higher than ambient pressure, and then to release the pressure.

According to a sixth aspect of the present invention, structure and/or steps are provided for cooling a plastic preform, including a receiving tube which receives the plastic preform such that an open end of the plastic preform is exposed, the receiving tube being in contact with an outside surface of the plastic preform. A cooling pin is inserted through the open end of the plastic preform into an interior thereof, and injects a cooling fluid therein. A pressure seal is coupled between the receiving tube and the cooling pin to maintain a pressure inside the plastic preform higher than ambient pressure. The pressure seal is configured to permit fluid communication between the inside of the plastic preform and a portion of the outside of the plastic preform.

According to a seventh aspect of the present invention, structure and/or steps are provided for cooling a plastic preform, including a receiving tube which receives the plastic preform such that an open end of the plastic preform is exposed, the receiving tube being in contact with an outside surface of the plastic preform. A cooling pin is inserted through the open end of the plastic preform into an interior thereof, and injects a cooling fluid therein. A pressure seal is coupled between the receiving tube and the cooling pin to maintain a pressure inside the plastic preform higher than ambient pressure. A vent is provided in the receiving tube to permit fluid communication between the inside of the plastic preform and an outside of said receiving tube.

According to an eighth aspect of the present invention, structure and/or steps are provided for cooling a molded plastic part, including a receiver cavity configured to hold the plastic part such that an opening in the plastic part is exposed. A cooling fluid provider is configured to provide a cooling fluid to an inside portion of the plastic part through the opening in the plastic part. A pressure seal is configured to provide a pressure seal between the inside of the plastic part and ambient pressure. A controller is configured to control the cooling fluid provider and the pressure seal to cause: (i) the pressure seal to provide the pressure seal and said cooling fluid provider to provide the cooling fluid such that a higher than ambient pressure is maintained on the inside portion of the plastic part; (ii) the pressure seal to release the pressure such that the pressure inside the plastic part is reduced; and (iii) the cooling fluid provider to provide further cooling fluid after the pressure seal releases the pressure such that the further cooling fluid flushes the inside of the plastic part.

According to a ninth aspect of the present invention, structure and/or steps are provided for cooling a molded plastic part, includes structure and/or steps for: (i) holding a plastic part in a receiver such that an opening of the plastic part is exposed; (ii) positioning a cooling fluid device to provide a cooling fluid to an interior of the plastic part through the opening; (iii) sealing the interior of the plastic part from ambient pressure; (iv) pressurizing the interior of the plastic part with the cooling fluid to higher than ambient pressure; (v) depressurizing the interior of the plastic part to ambient pressure; (vi) flushing the interior of the plastic part with cooling fluid; (vii) re pressurizing the interior of the plastic part with the cooling fluid to higher than ambient pressure; (viii) again depressurizing the interior of the plastic part to ambient pressure; and (ix) again flushing the interior of the plastic part with cooling fluid.

BRIEF DESCRIPTION OF THE DRAWINGS

The advantageous structure and/or function according to the present invention will be more easily understood from the following detailed description of the preferred embodiments and the appended Drawings, as follows.

FIGS. 12a–12m comprise schematic charts representing an operating sequence for a post mold cooling turret, and the preforms it handles through one entire treatment cycle.

FIG. 24a comprises an alternate cooling tube embodiment with a blow pin and sealing annulus for negative draft preforms with a pin partially retracted to allow venting of the interior space.

FIGS. 32a–32l comprise charts of an alternate embodiment showing the various component positions through one molding cycle.

DETAILED DESCRIPTION OF THE PRESENTLY PREFERRED EXEMPLARY EMBODIMENTS

1. Introduction

The present invention will now be described with respect to several embodiments in which an Index plastic injection molding machine uses a (preferably rotating) take out turret to extract plastic preforms from a molding unit, and sequentially move these preforms to first and second cooling stations. Preferably, the first cooling station comprises a so-called SuperCool™ device in which a cooling pin is inserted into each preform, each preform is pressure-sealed, and cooling air is injected into the interior of the preform. The pressure causes the outside walls of the preform to contact the inside walls of the take out cavity, thus effecting cooling on both the inside and outside surfaces of the preform. Preferably, the second cooling station comprises a so-called CoolJet™ device in which a cooling pin is inserted into each preform, cooling air is injected to the interior tip of the preform, and the cooling air flows down the inside surface of the preform to the outside. Nevertheless, it should be understood that the teachings and claims of the subject invention are equally applicable to other molding processes used for producing relatively thick-walled hollow articles.

1. The Structure

Figure 1:
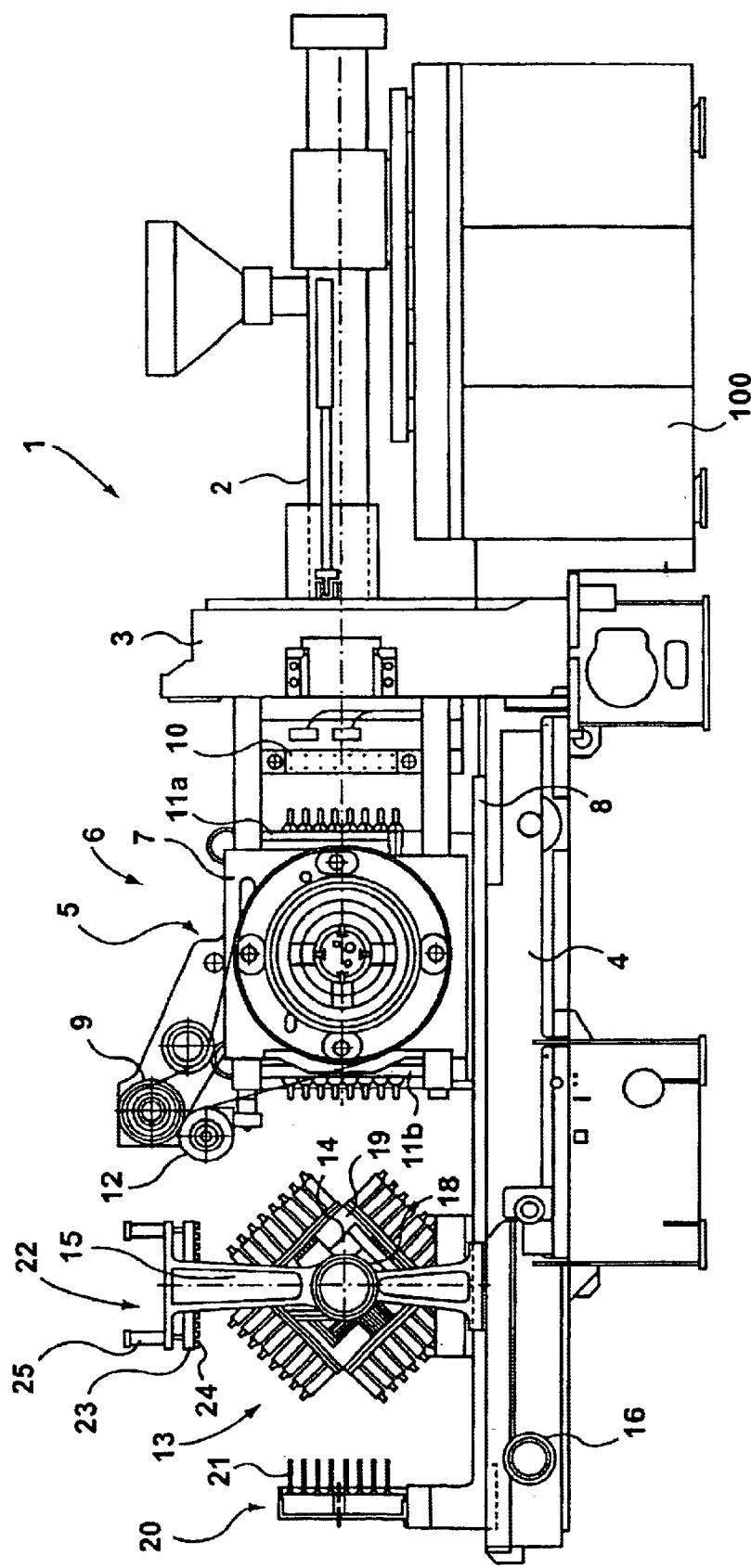
FIG. 1 comprises a side view of a molding machine system showing a molding turret in an mold open position, and the post mold cooling turret rotating.

FIG. 1 shows the general layout of a molding machine system that includes an Index injection molding machine 1, having an injection unit 2, a stationary platen 3, fixed to a base 4, and a movable platen 5 that includes a rotary mold mounting block 6 having trunnions that mount in carriers 7 on each end of the block 6. Carriers 7 slide on ways mounted on the base 4 and are releasably connected to the stationary platen by combination lock nuts and clamping pistons. The moving platen assembly is moved toward and away from the stationary platen by cylinders 8, and the rotary block is rotated by motor and belt drive 9. An injection mold half 10 is mounted to the stationary platen and at least two mating mold halves 11a, and 11b are mounted to opposed faces of the rotary block 6. Also mounted to the carriers are at least one blower 12 positioned so as to direct its cooling air flow toward the mold half 11b so as to cool the freshly molded parts thereon.

A controller 100 (integrated as part of the injection molding machine) controls all timing and actuation sequences for the post mold cooling mechanisms mounted on the machine. Further, it controls the operational sequences for all the conditioning stations including determining the position and motion of their respective components, the timing, flow rates, temperatures, etc. of the conditioning fluids and vacuum systems they utilize and other operational conditions that are controlled to optimize the entire molding cycle. Preferably, the controller comprises one or more processors, general purpose computers, Application Specific Processors, Digital Signal Processors, hard-wired circuitry, etc., with sufficient memory (ROM, RAM, disk, CD, etc.) to process one or more software programs containing code for carrying out the functions to be described below.

A post mold cooling turret 13 includes a turret 14 having trunnions mounted in carriers 15 at each end of the turret that is rotatable therebetween. The carriers also slide on the ways on the base 4 and are moved by drive motor and belt means 16. Motor 18 is mounted on one of the carriers 15 and causes the turret to rotate. The turret has at least two opposed faces on which are mounted receiver tubes 19 suitable for holding the molded parts.

Figure 2:
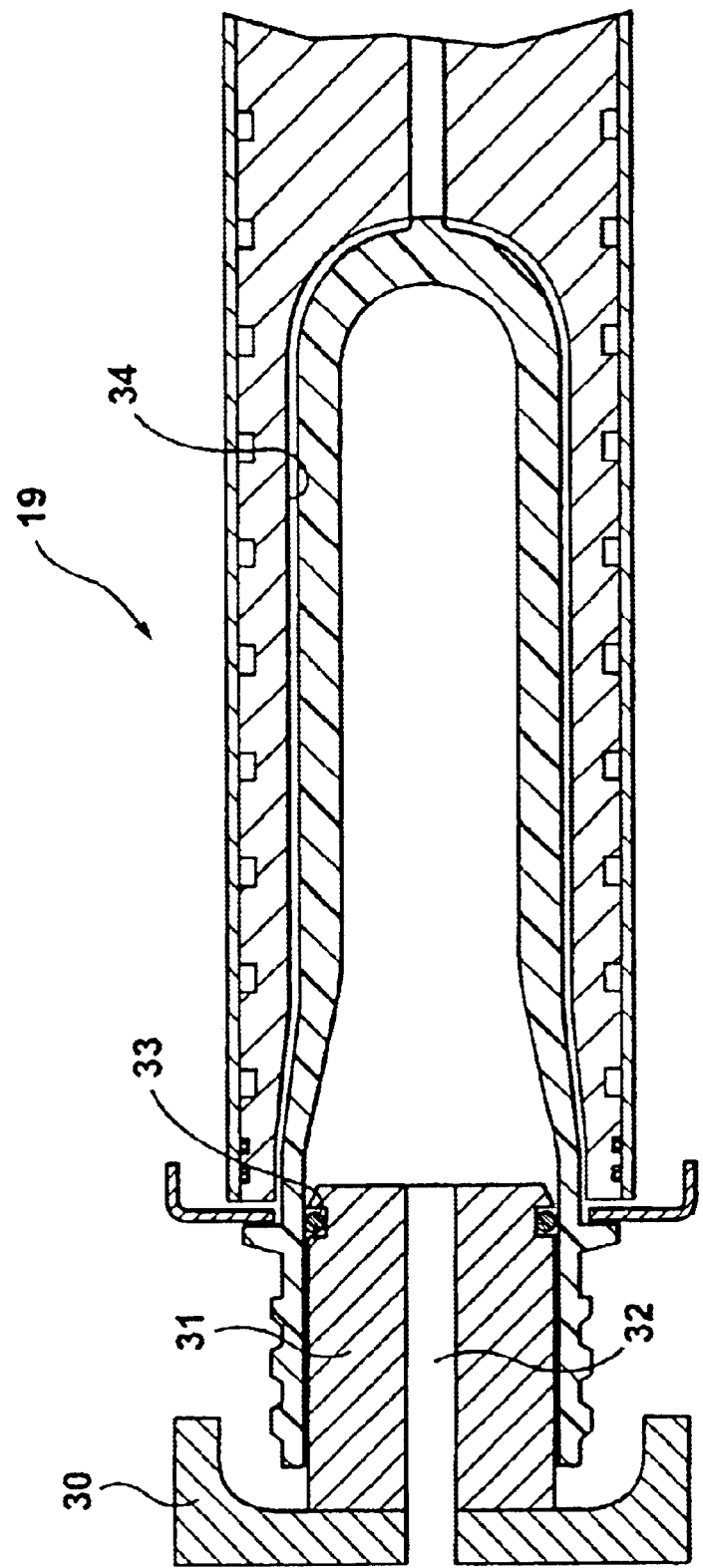
FIG. 2 comprises a section view of a cooling tube and a pressurizing plug with a freshly loaded preform.

The tubes, see FIG. 2, may have an internal shape made slightly larger than the parts they are designed to accept or may have an internal shape slightly smaller so that the part must shrink in diameter somewhat before it can completely enter the receiver. The tubes 19 may be directly or indirectly cooled (e.g. water and/or air) and may provide a vacuum source 61, which when activated, urges the part to remain in the tube so that it can be carried by the tube during rotation and translation of the turret on the base. The vacuum can be replaced by an air blast as one means for ejecting the part from the tube, when required. Of course, any pneumatic or mechanical means may be used to eject the preforms from the tubes.

A conditioning station 20 is mounted to the base 4 at the distal end of the base from the stationary platen 3. The conditioning station 20 includes conditioning elements 21, one for each molded part, arranged so that they can be aligned to enter the molded parts when the post mold cooling turret 13 is moved on the base, to align the parts with the elements 21.

Figure 21A:
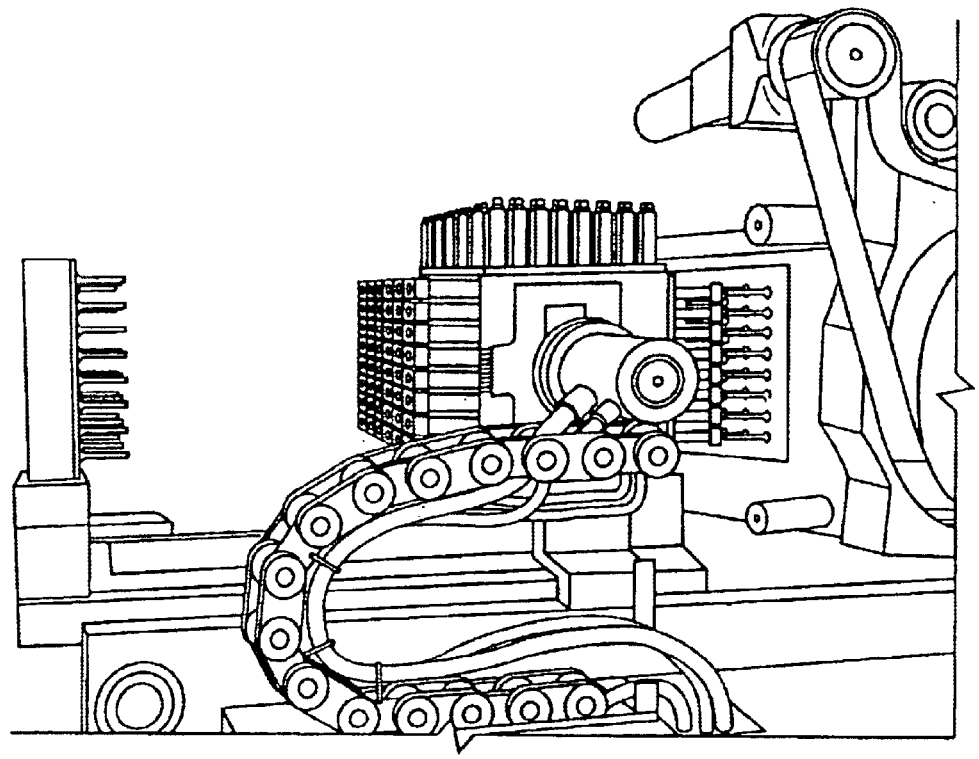
FIGS. 21a–21b depict an embodiment of a molding machine system showing a post mold cooling turret in two positions.
Figure 21B:
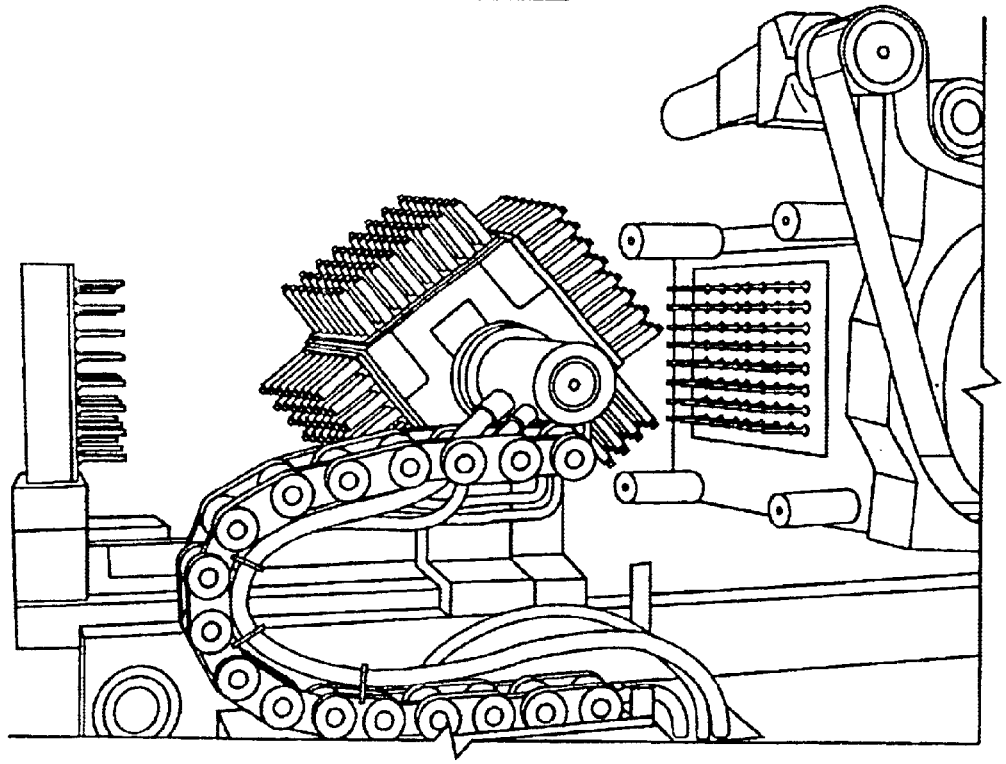

FIG. 21a shows the molding system embodiment described so far and FIG. 21b shows the same embodiment with the post mold cooling turret 13 rotating.

A second conditioning station 22 is mounted on the post mold cooling turret 13 and includes a movable plate 23 that carriers conditioning elements 24, one for each molded part, arranged so that they can be aligned to enter the molded parts when the post mold cooling turret 13 is rotated to align the parts with the elements 24 and when plate 23 is advanced, by means of cylinders 25. Because the second conditioning station 22 is carried by the post mold cooling turret 13, it can engage the conditioning elements 24 with the parts carried in the tubes 19 at any time they are so aligned, including times when the post mold cooling turret 13 is moving along the base, thereby optimizing the conditioning time available for station 22.

FIG. 2 shows one of the conditioning station units used for pressurizing the preform interior to aid cooling. The unit includes a base 30, upon which is mounted a plug 31 having a through hole 32. The plug also has an external seal 33 so that when the plug is inserted into a partially cooled preform the seal is operable to contain fluid pressure injected via the hole 32 to the preform interior.

Figure 3:
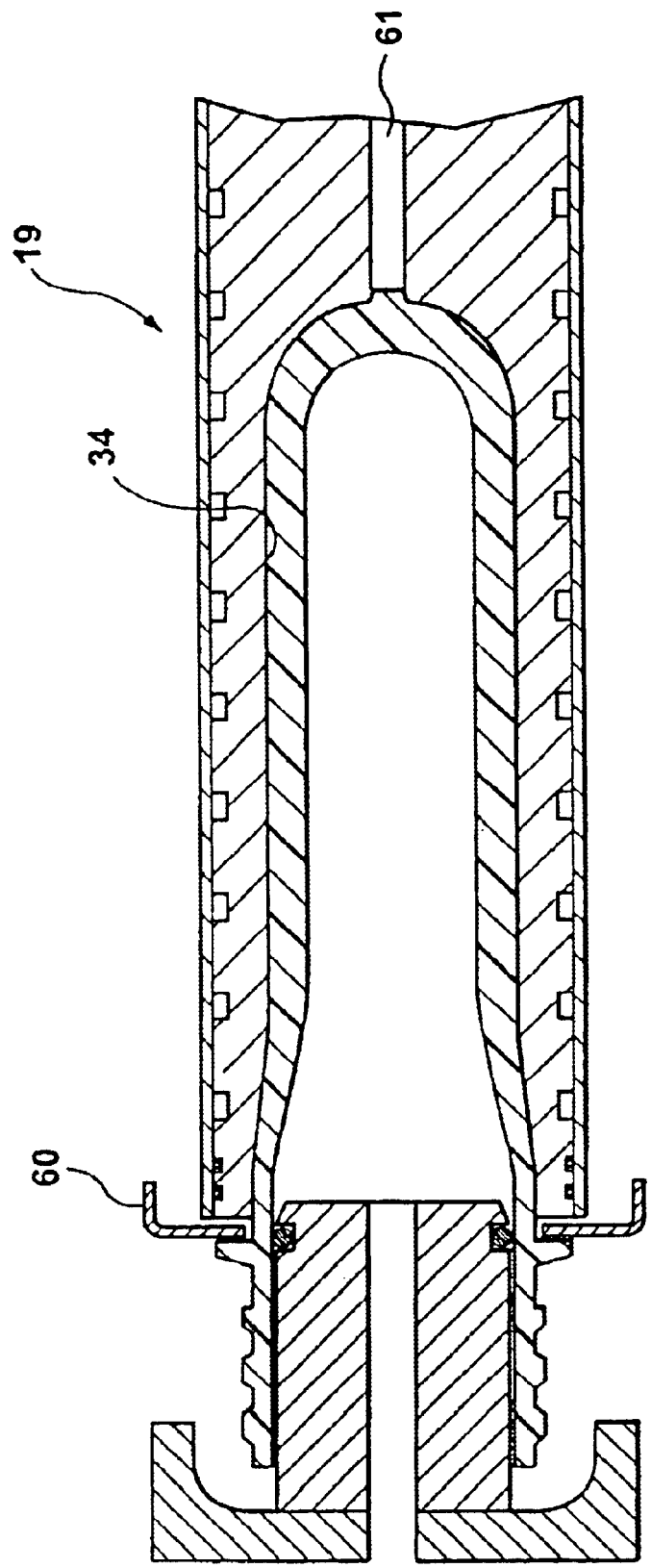
FIG. 3 comprises a section view of a cooling tube and a pressurizing plug with loaded preform after pressurizing.

The pressurized fluid causes the partially cooled preform to expand and touch the inner wall 34 of the cooling tube 19 as shown in FIG. 3 thereby ensuring sustained contact with the wall to permit efficient thermal transfer of heat from the preform to the cooled tube wall by conduction. The internal pressure counteracts the tendency of the preform the shrink away from the tube wall as it cools. If this is allowed to happen contact between the preform and tube wall would cease in some places and thereby cause an unequal thermal transfer since conduction cooling would cease at those places while continuing in others. Such unequal thermal transfer is known to cause a non-round preform body to be formed or other defects associated with non uniform shrinkage. The cooling medium may comprise any fluid (liquid or gas) such as air, nitrogen, water, heat transfer liquid, etc.

After a period of time at this station has elapsed (e.g., 1–15 seconds), the pressurized fluid is vented from the preform interior allowing the plug to be withdrawn and leaving the part in the tube. Cooling of the preform may continue after venting and plug extraction as the preform's outer skin may have cooled sufficiently to maintain a shape that resists shrinking away from the tube wall, thereby permitting uniform conduction cooling to continue in an unpressurized condition. The efficacy of unpressurized cooling will depend on the wall thickness of the particular preform being processed. After the pressure is released, further cooling fluid may be injected into the preform interior at the same or a different cooling station. This pressurize-release cycle can be repeated any number of times using any combination of cycle times and cooling stations.

Figure 4:
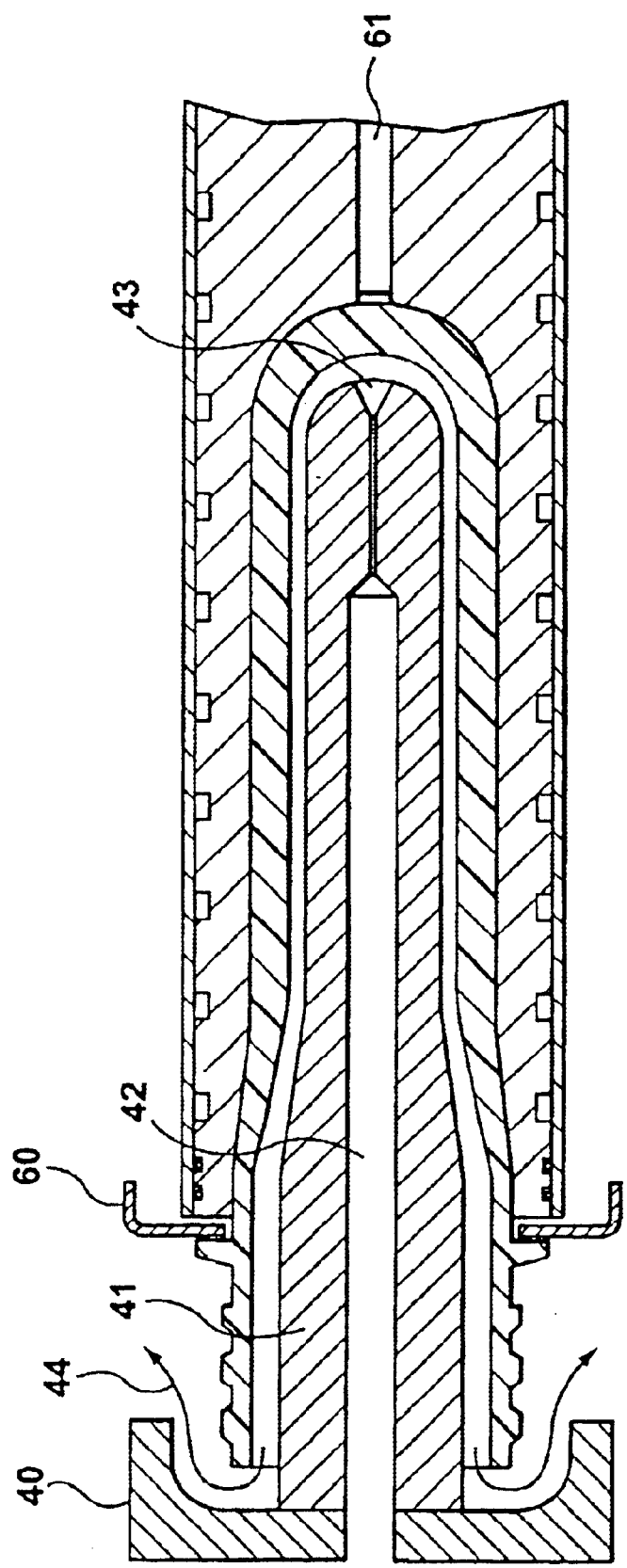
FIG. 4 comprises a section view of a cooling tube, and a blowing pin inserted into perform.

FIG. 4 shows a second conditioning station unit used for applying internal fluid cooling to the preform interior. The unit includes a base 40 and cooling pin 41 that contains an internal channel 42, with an outlet 43, opposite the gate area of the part being cooled. Cooling fluid is introduced via the channel 42 and is vented at the open end of the part 44. The cooling pin 41, can have any suitable length and may be moved during its application of the cooling fluid to vary the application of the fluid to different parts of the interior surface of the part. For a typical 0.5 L preform of dimension 28 mm dia.×100 mm long, the cooling pin 41 may be in the ranges of 3–26 mm dia.×0–99 mm long.

Figure 5:
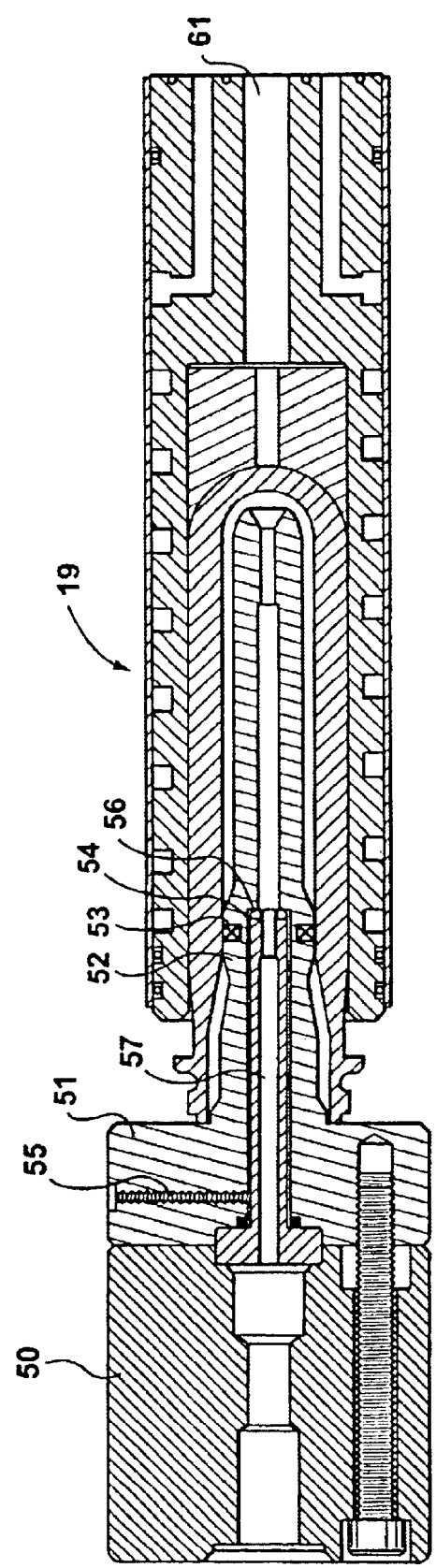
FIG. 5 comprises a section view of a cooling tube, and a combined pressurizing plug and blowing pin with preform, during preform conditioning.
Figure 6:
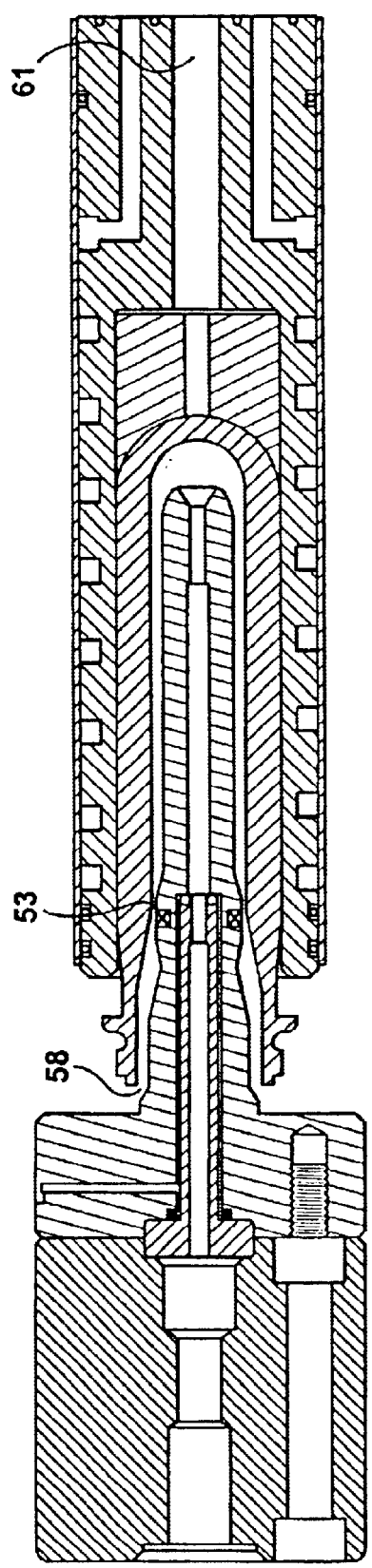
FIG. 6 comprises a section view of a cooling tube, and a combined pressurizing plug and blowing pin with preform, with a pin partially retracted to vent the perform interior.

FIGS. 5 and 6 show an alternate and preferred embodiment of a conditioning station unit. This unit combines the features of the two units described above and can be operated in either mode or a combination of both modes. The unit includes a base 50 and probe 51, that is a combined cooling pin and plug, mounted thereon. The probe's plug portion 52 includes a "Quadring®", "Kantseal" or other similar elastomeric, bi-directional seal 53, installed in a groove 54 that can be supplied with pressurized fluid via channel 55. Quadring® seals are four lipped seals with a specially developed sealing profile. A wide range of elastomer materials may be used for both standard and special applications. Quadring® seals are vulcanized as a continuous ring characterized by an annular form with a four lipped profile. The Quadring® has a double sealing function. They seal forces acting in the radial and the axial directions. The seal may be made of Acrylonitrile Butadiene Elastomer. The type X-sel® Quadring® may be used and has a special, thin, highly wear-resistant blue plastic coating. The Kantseal may be used to supplement or in place of the Quadring®. The Kantseal is a washer-shaped seal made of elastomer materials. Seal 56 prevents the fluid from entering the central supply channel 57 so that the pressure in channel 55 can be controlled independently of the pressure in channel 57.

When pressure is applied in channel 55 the Quadring seal 53, expands in diameter to seal against the interior surface of the preform while maintaining its seal within the groove 54, thereby allowing the interior space of the preform to be pressurized by cooling fluid supplied via channel 57. Thus, the preform can be pressurized internally and its external surface can be maintained in contact with the internal wall of the cooling tube 19 as described above.

When the pressure in channel 55 is removed, the Quadring seal 53, returns to its former shape allowing the interior space of the preform to be vented and the cooling fluid that has been heated within the space to be replaced by a fresh, cooler supply via channel 57. The unit can be slightly retracted, as shown in FIG. 6, to increase the venting flow past the relaxed seal 53 and via the open end of the part 58. Also, moving the probe 51 while the cooling fluid continues to flow therethrough allows the fluid to be applied to various internal surfaces of the part. Thus, this preferred embodiment provides all the combined features of the two embodiments described above.

FIGS. 2–4 show a mechanical ejector 60 for ejecting the parts out the receiving tubes 19. FIGS. 2–5 show a channel 61 that can provide a source of vacuum to aid loading the preform, and a source of pressurized air to eject the preform from the tube.

1. The Process

Figure 20:
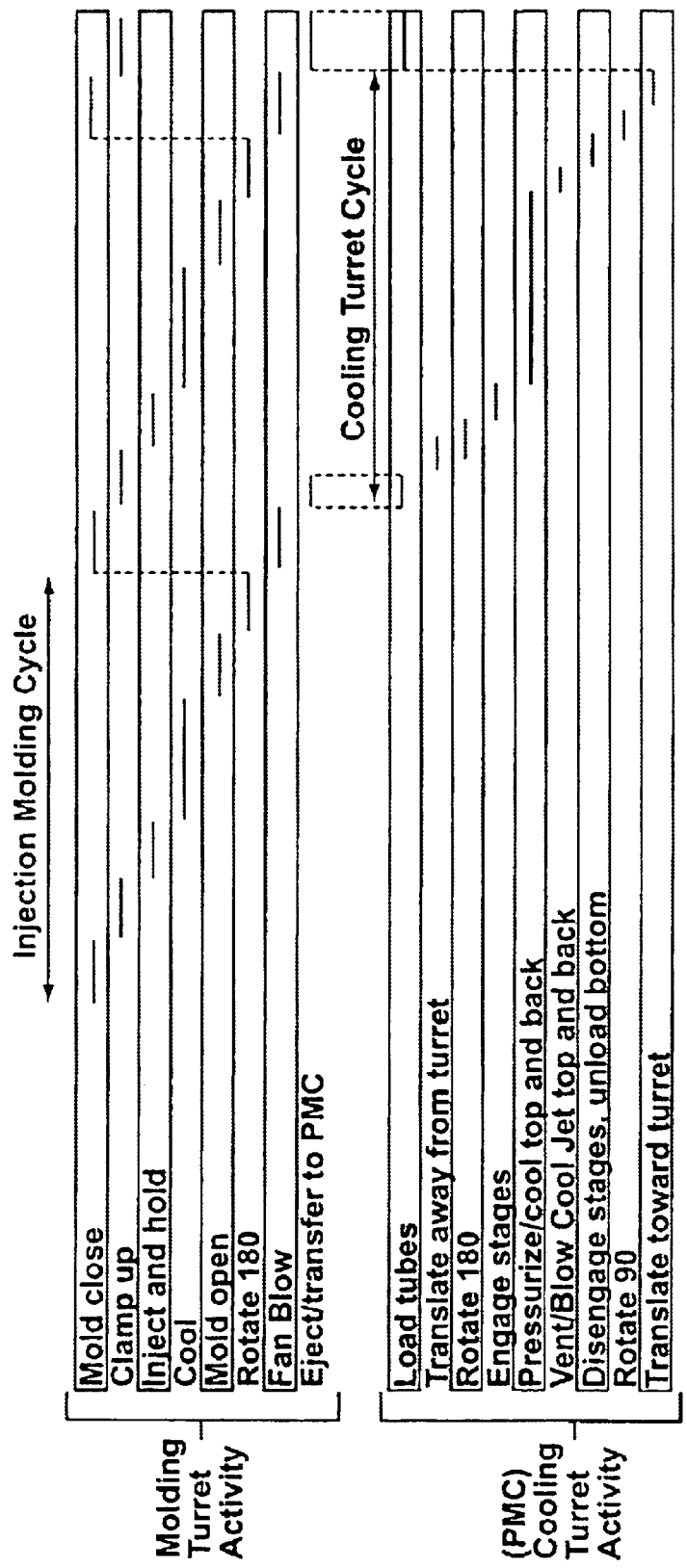
FIG. 20 comprises a preferred embodiment sequence chart for one of the operating sequences of an injection molding system in which a post mold cooling turret initially rotates 180 degrees and subsequently rotates in two 90 degree increments.

FIGS. 7–12 inclusive describe a first operational sequence. The equipment configuration for this sequence includes using a conditioning station 22 of the type shown in FIGS. 2–3, mounted on the post mold cooling turret carrier 15, and a conditioning station 20 of the type shown in FIG. 4 mounted on the base 4. Generally, the total cycle time from preform mounting to preform ejection in the preferred embodiment is determined by the molding cycle time. For example, with a molding cycle time of 10 seconds a freshly loaded preform in the cooling structure will be continuously cooled in its tube for approximately 39 seconds and conditioned intermittently by the cooling stations for approximately a total of 27 seconds before being ejected. With reference to FIG. 20 typical times to load or unload tubes, engage or disengage stages are about 0.5 seconds whereas typical times to translate the cooling structure toward or away from the molding turret block and simultaneously rotate the turret vary from 0.5 seconds for a 90 degree rotation to 1 second for a 180 degree rotation.

Figure 7:
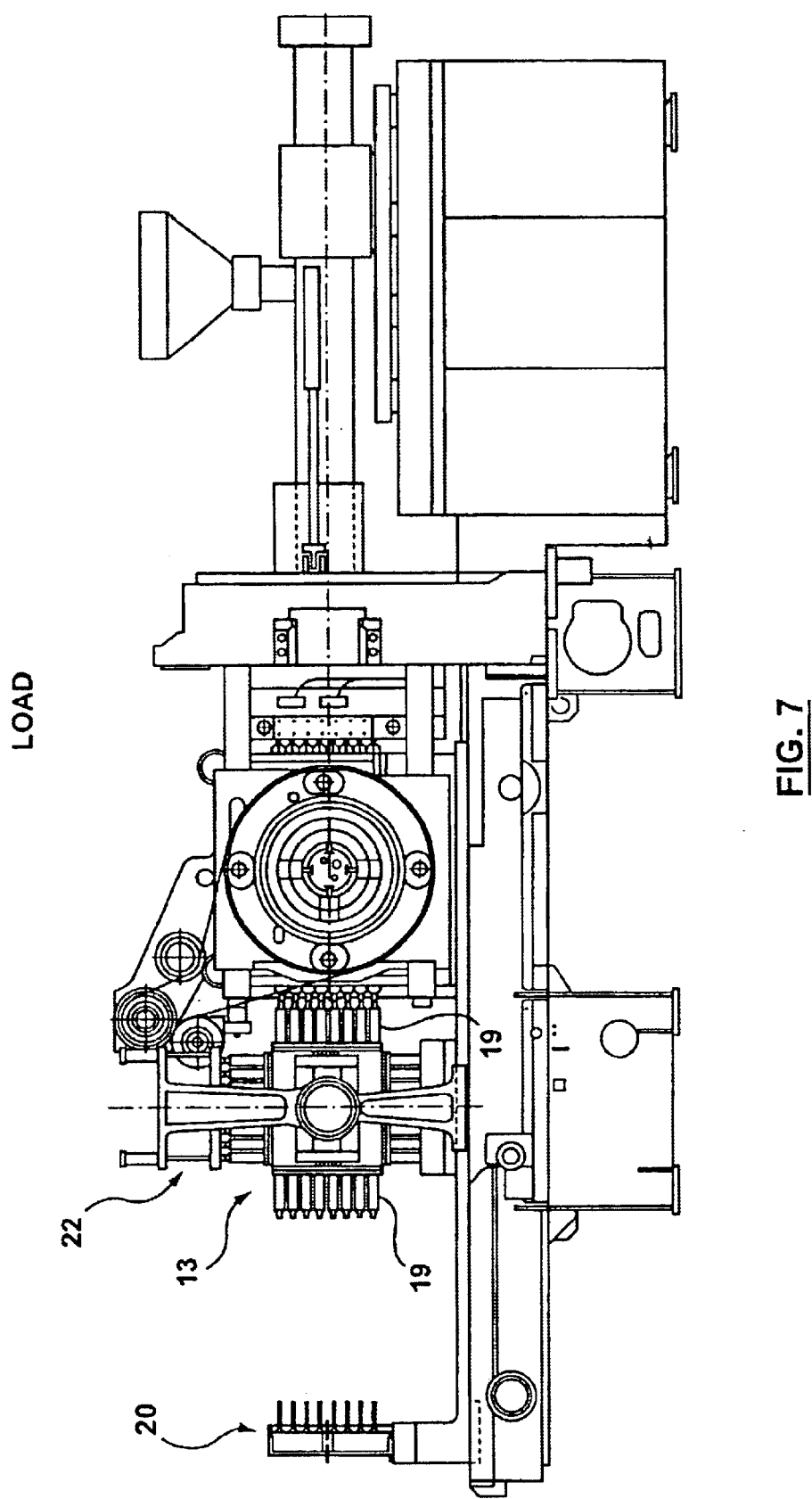
FIG. 7 comprises a side view of a molding machine system with a post mold cooling turret in the transfer (load) position.

FIG. 7 shows the equipment in the loading position wherein the freshly molded parts are being transferred from injection molding cores 11*b* on the molding turret 6 to the receiving tubes 19 on the post mold cooling turret 13. The conditioning station 22 is shown engaged with the parts molded in the previous injection cycle, and the conditioning station 20 is shown disengaged.

Figure 8:
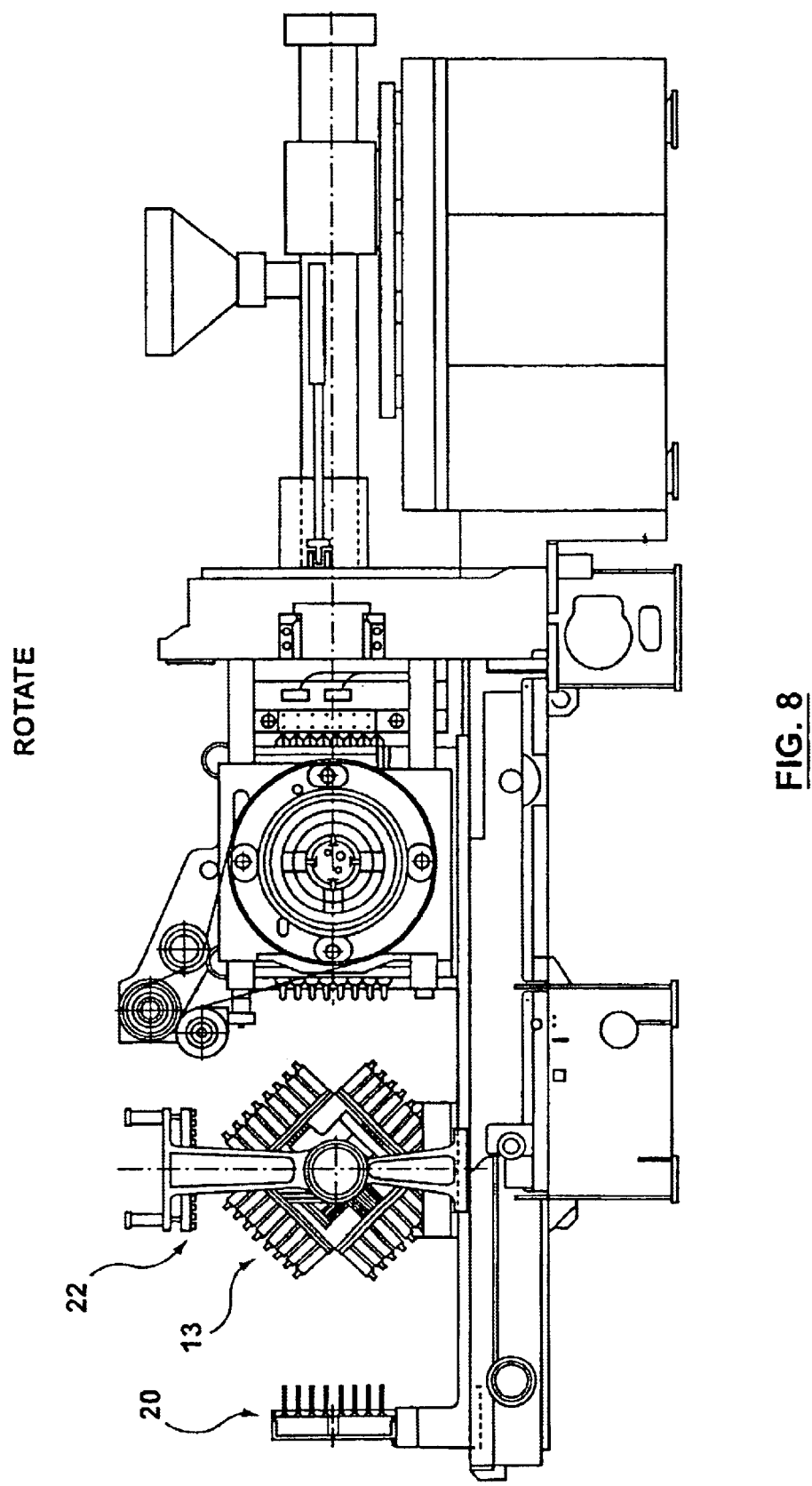
FIG. 8 comprises a side view of a molding machine system with a post mold cooling turret in rotating position.

FIG. 8 shows the equipment in the next step where the post mold cooling turret 13 has been translated away from the injection molding turret to provide clearance for it to rotate 90 degrees to move the freshly molded parts now held in the receiving tubes to the top position of the turret for alignment with conditioning station 22, which has been disengaged from the previous set of parts prior to rotation.

Figure 9:
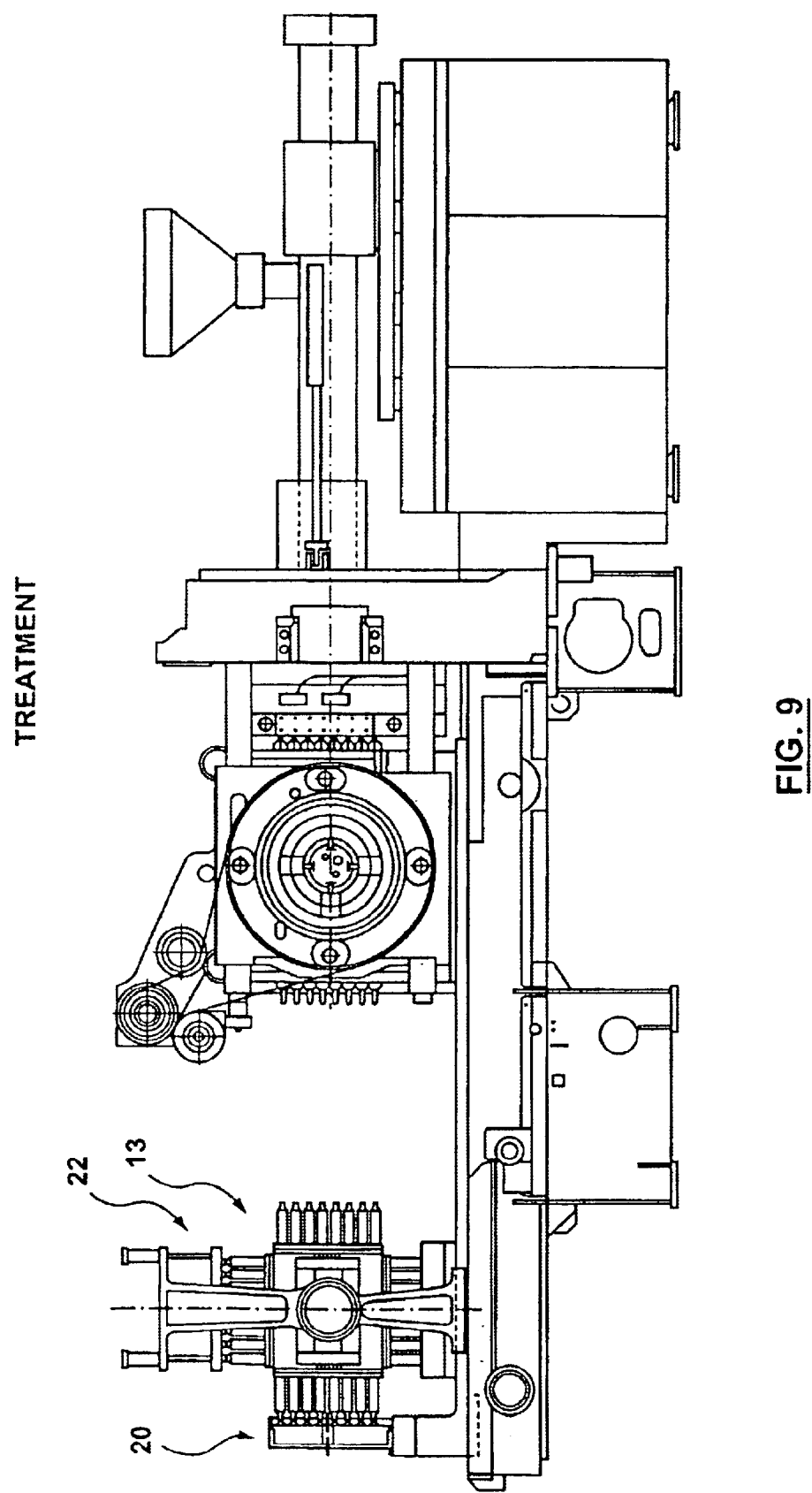
FIG. 9 comprises a side view of a molding machine system with a post mold cooling turret in one of the conditioning (treatment) positions.

FIG. 9 shows the equipment in the next step where the post mold cooling turret 13 is engaged with the conditioning station 20, and the conditioning station 22 has also been engaged.

Figure 10:
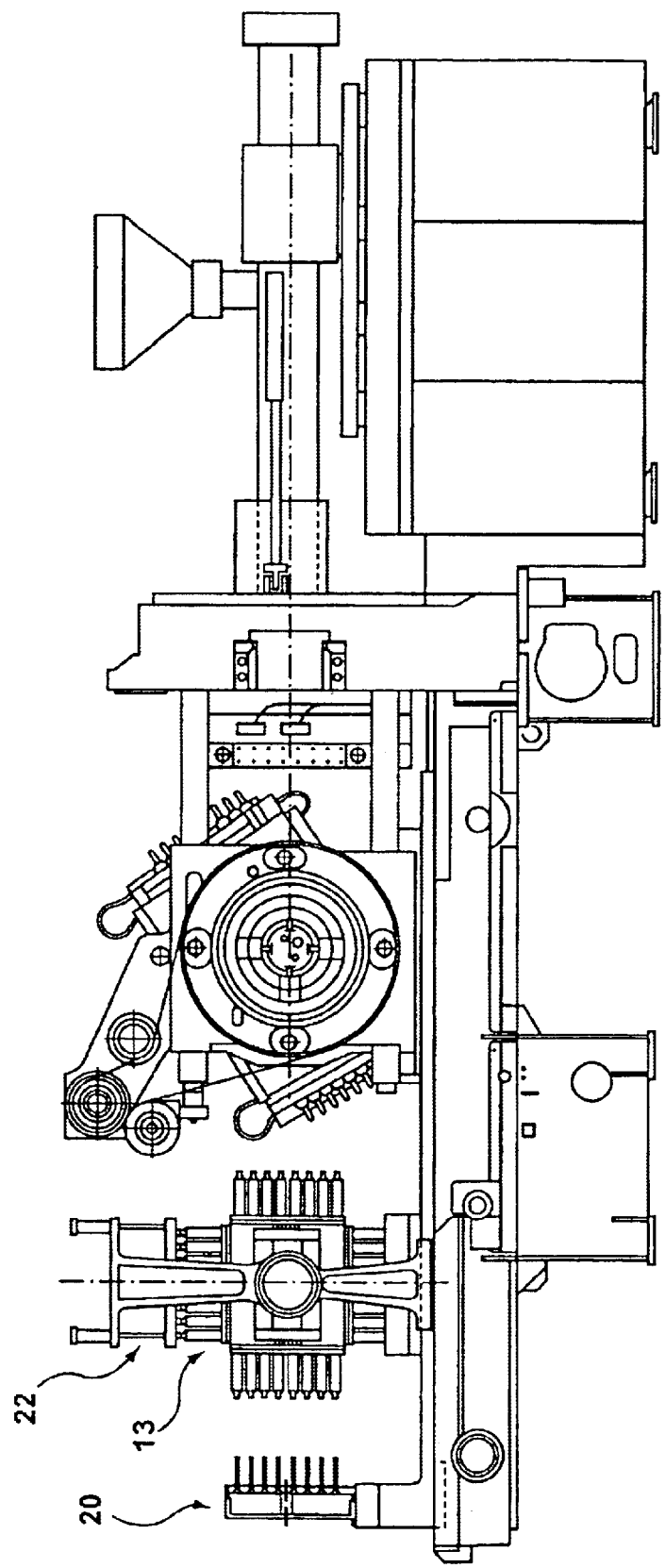
FIG. 10 comprises a side view of a molding machine system with a molding turret rotating, and a post mold cooling turret in a second conditioning (treatment) position.

FIG. 10 shows the equipment in the next step where the post mold cooling turret 13 has been translated away from the conditioning station 20, thereby disengaging it. However, the conditioning station 22 may remain engaged during the translation. Meanwhile, the injection turret has been translated away from the stationary platen to allow clearance for it to rotate 180 degrees to present a freshly molded set of parts for transfer to the post mold cooling turret 13. Prior to, during, or after this translation, the finished parts in the lowermost receiving tubes 19 can be ejected downwards onto a conveyor below the base of the machine (not shown) thereby vacating the lowermost receiving tubes so that they are ready to accept the next batch of parts.

Figure 11:
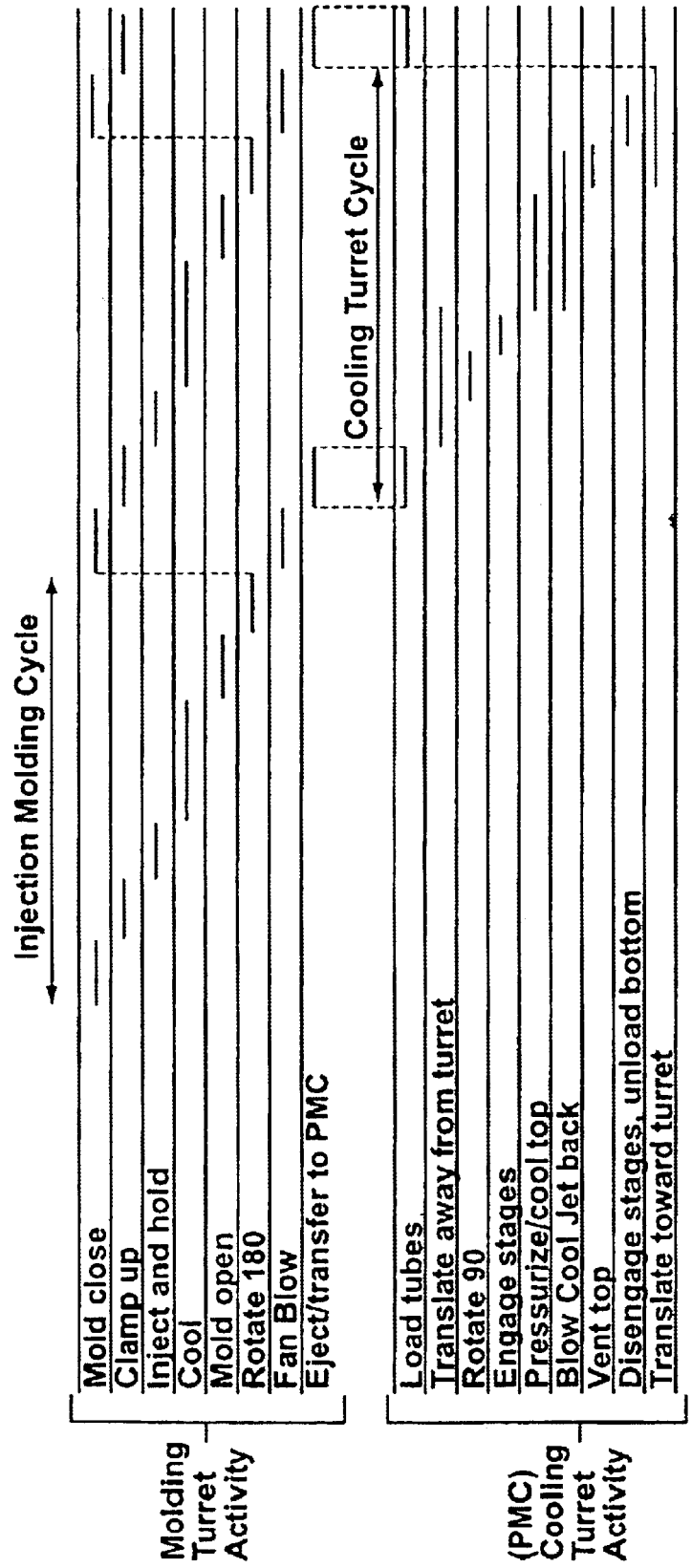
FIG. 11 comprises a sequence chart for one of the operating sequences of the injection molding system in which the post mold cooling turret rotates in 90 degree increments.
Figure 12B:
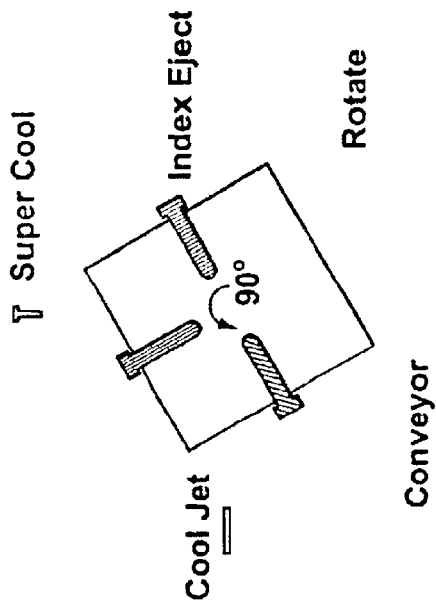
Figure 12D:
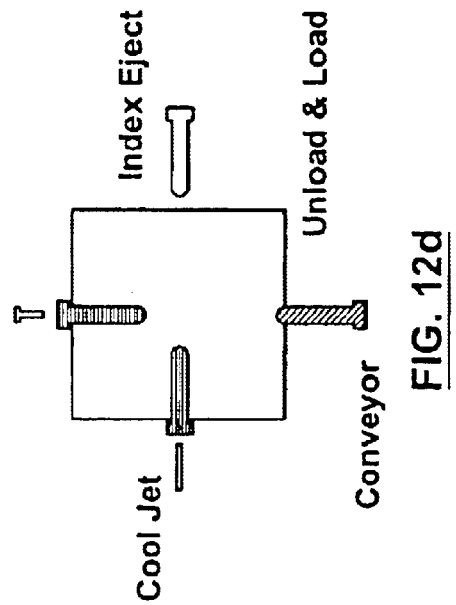
Figure 12A:
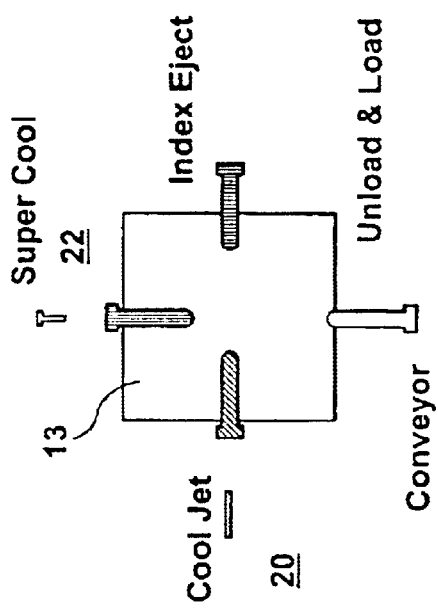
Figure 12C:
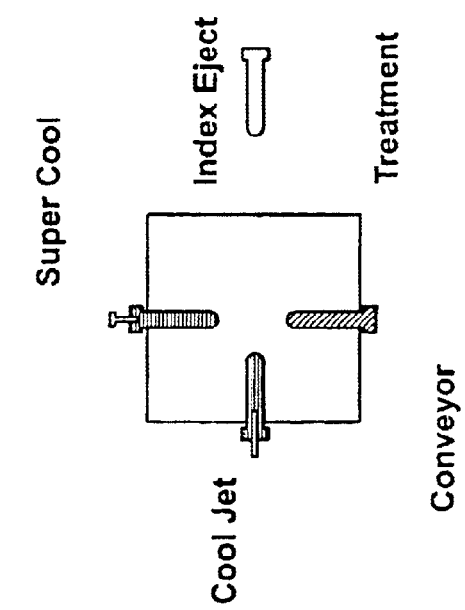
Figure 12M:
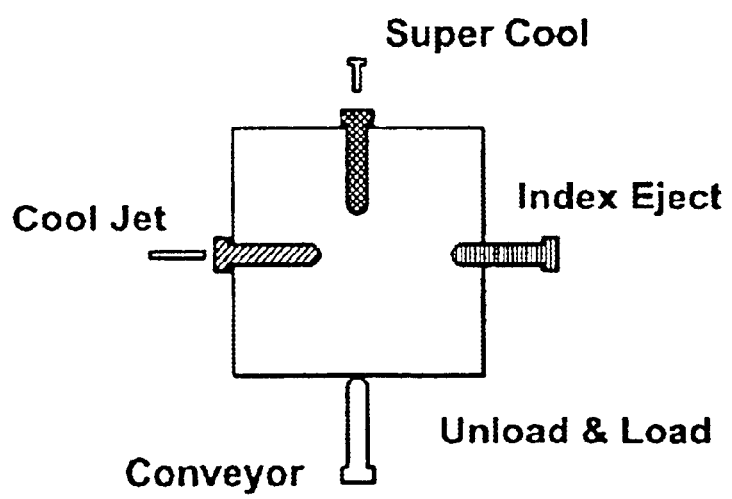

FIG. 11 shows a sequence chart corresponding to the steps described above. The chart shows the relationship between the injection molding cycle and the post mold cooling turret cycle, and when the parts are transferred between them. In the sequence described, the post mold cooling turret 13 rotates 90 degrees after part transfer from the molding turret so that the freshly loaded parts can be immediately treated by conditioning station 22. This means that the receiving tubes previously vacated remain unfilled until the next transfer of parts occurs from the molding turret.

The above-described minor disadvantage is more easily seen in FIGS. 12*a*–12*m*, that illustrate each event that occurs on the post mold cooling turret means through its complete cycle. Conditioning station 22 is captioned "SuperCool" and conditioning station 20 is captioned "CoolJet". Parts are ejected downward from the lowermost side of the turret and parts are loaded horizontally at the rightmost side of the turret. By following a preform of a particular number through the entire sequence it becomes evident how the various treatments are applied in this particular sequence of operation.

FIGS. 13–18 inclusive depict a second operational sequence. The equipment configuration for this sequence includes using a conditioning station 20 of the type shown in FIGS. 2–3, mounted on the post mold cooling turret carrier 15, and a conditioning station 22 of the type shown in FIG. 4 mounted on the base 4.

Figure 13:
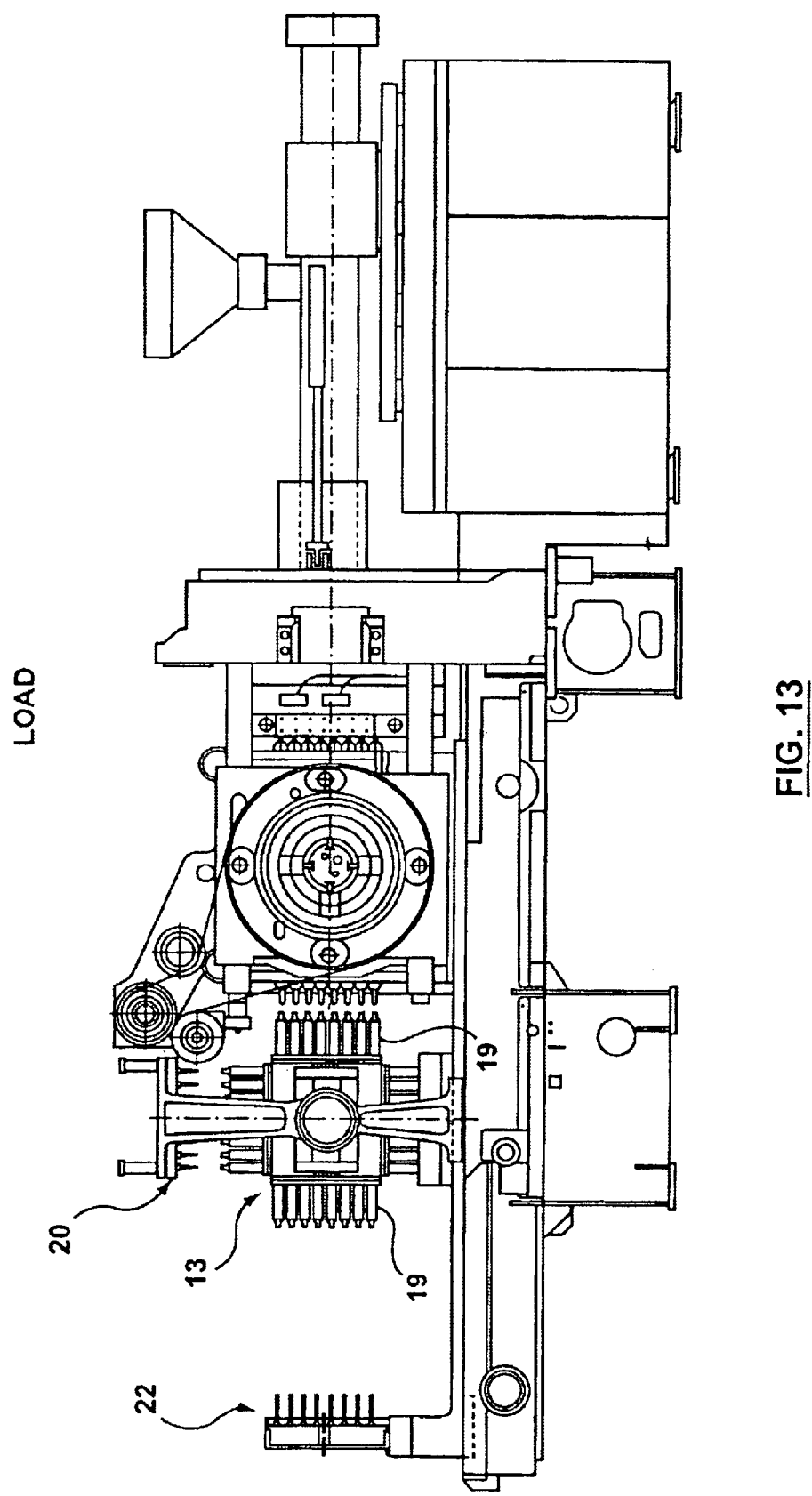
FIG. 13 comprises an alternate embodiment side view of a molding machine system with a post mold cooling turret approaching the transfer (load) position.

FIG. 13 shows the equipment leaving the loading position wherein the freshly molded parts have been transferred from injection molding cores 11b on the molding turret 6 to the receiving tubes 19 on the post mold cooling 13. The conditioning station 20 is shown disengaged with the parts molded in the previous injection cycle as the post mold cooling turret is about to rotate, and the conditioning station 22 is also shown disengaged.

Figure 14:
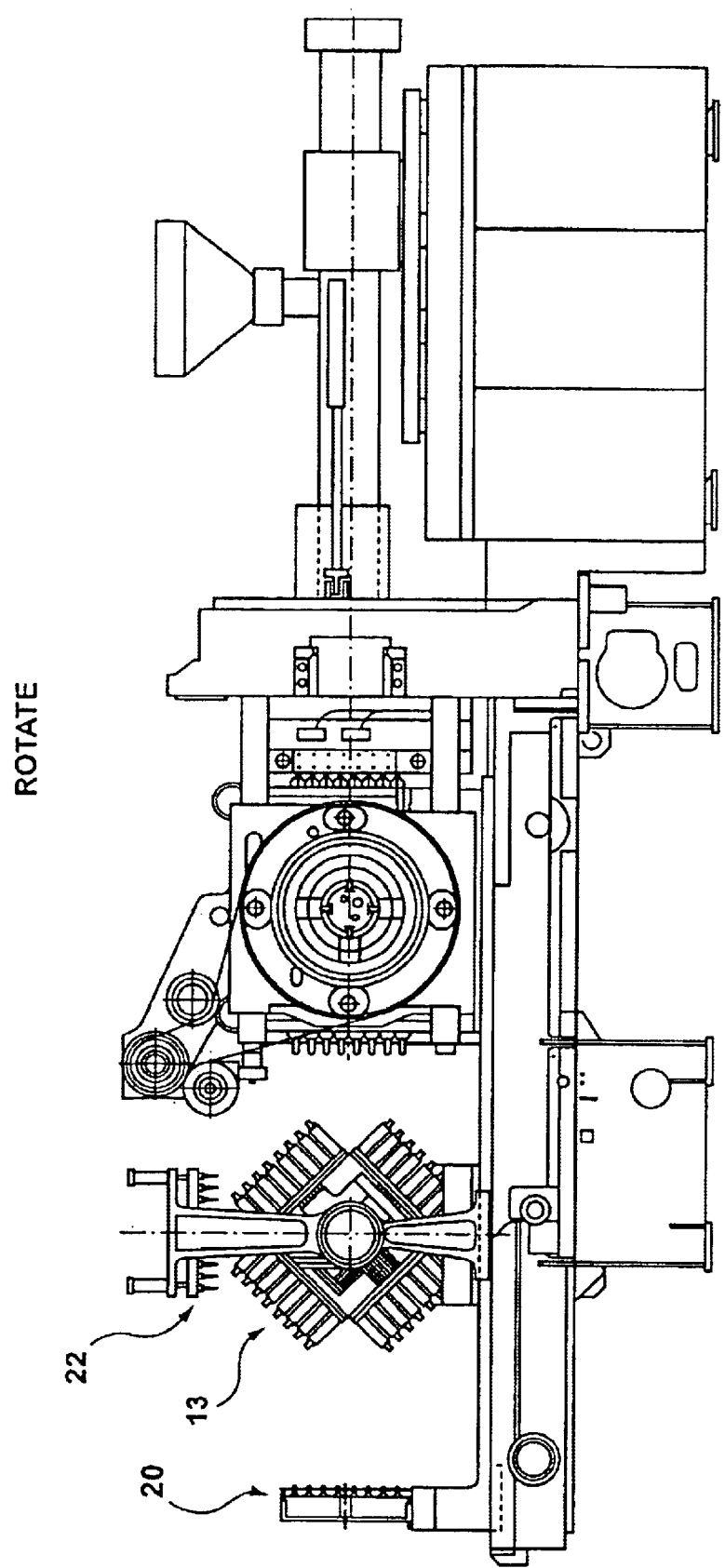
FIG. 14 comprises an alternate embodiment side view of a molding machine system with a post mold cooling turret in a rotating position.

FIG. 14 shows the equipment in the next step where the post mold cooling turret 13 has been translated away from the injection molding turret to provide clearance for it to rotate 180 degrees to move the freshly molded parts now held in the receiving tubes to the back position of the turret for alignment with conditioning station 22.

Figure 15:
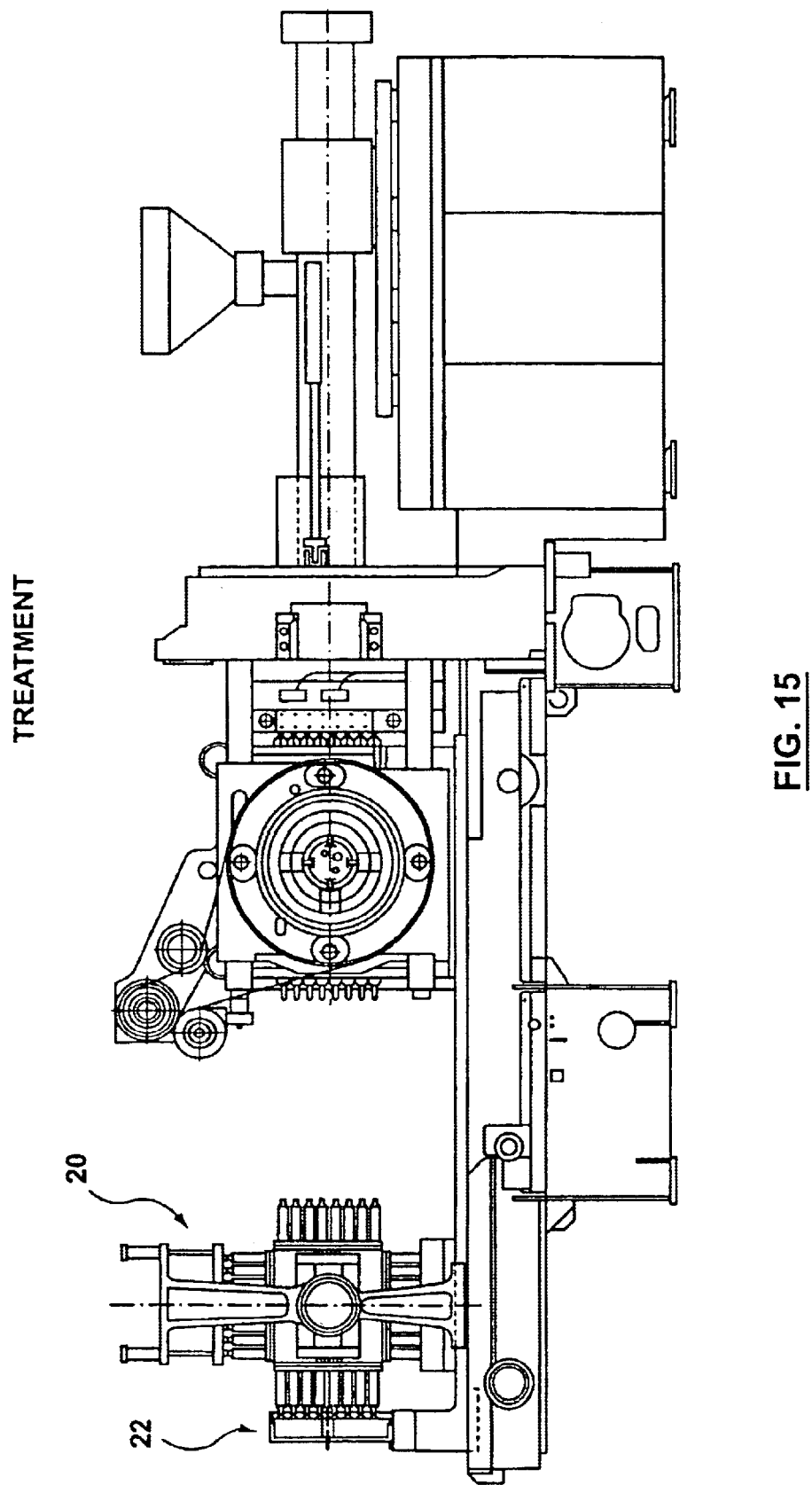
FIG. 15 comprises an alternate embodiment side view of a molding machine system with a post mold cooling turret in one of the conditioning (treatment) positions.

FIG. 15 shows the equipment in the next step where the post mold cooling turret 13 is engaged with the conditioning station 22, and the conditioning station 20 has also been engaged.

Figure 16:
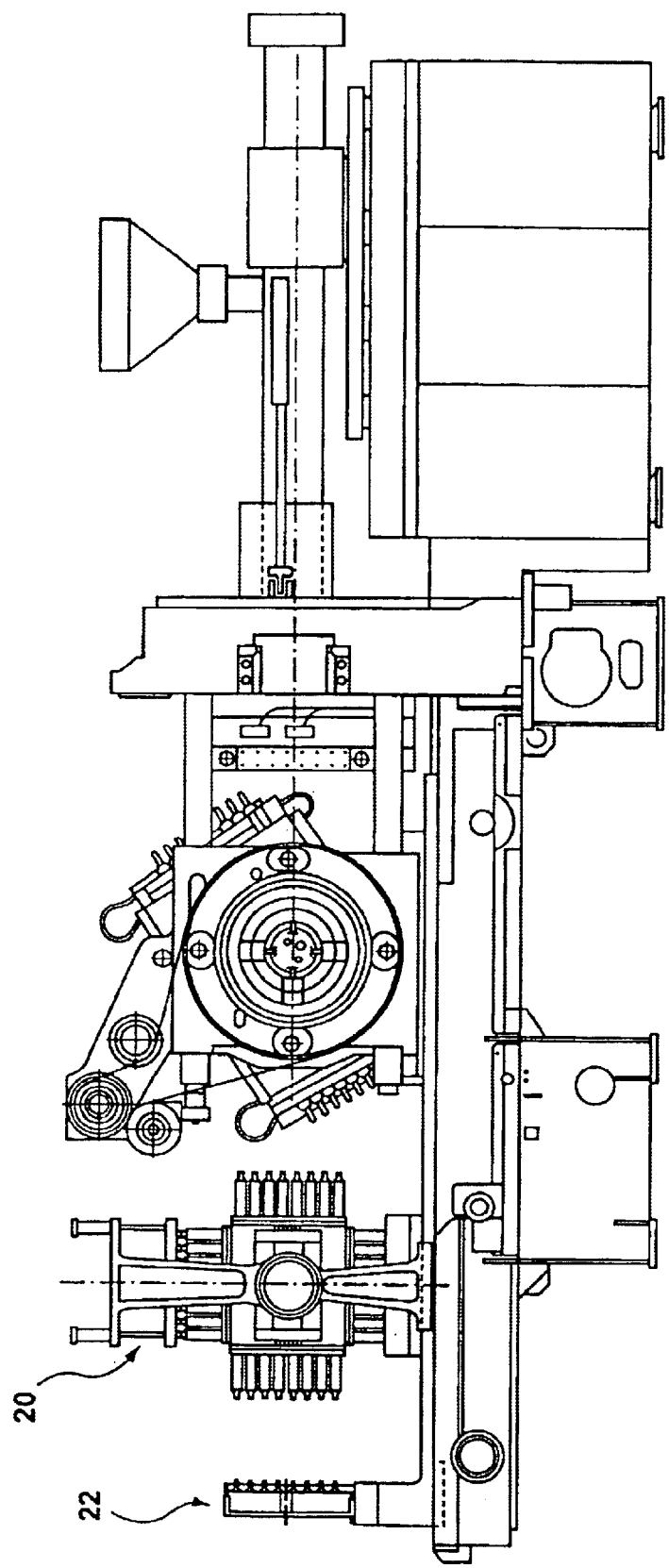
FIG. 16 comprises an alternate embodiment side view of a molding machine system with a molding turret rotating, and a post mold cooling turret in a second of the conditioning (treatment) positions.

FIG. 16 shows the equipment in the next step where the post mold cooling turret 13 has been translated away from conditioning station 22, thereby disengaging it. However, the conditioning station 20 may remain engaged during the translation. Meanwhile the injection turret means has been translated away from the stationary platen to allow clearance for it to rotate 180 degrees to present a freshly molded set of parts for transfer to the post mold cooling turret 13. Prior to, during, or after this translation the finished parts in the lowermost receiving tubes 19 can be ejected downwards onto a conveyor below the base of the machine (not shown) thereby vacating the lowermost receiving tubes so that after the turret rotates 90 degrees they are ready to accept the next batch of parts.

Figure 17:
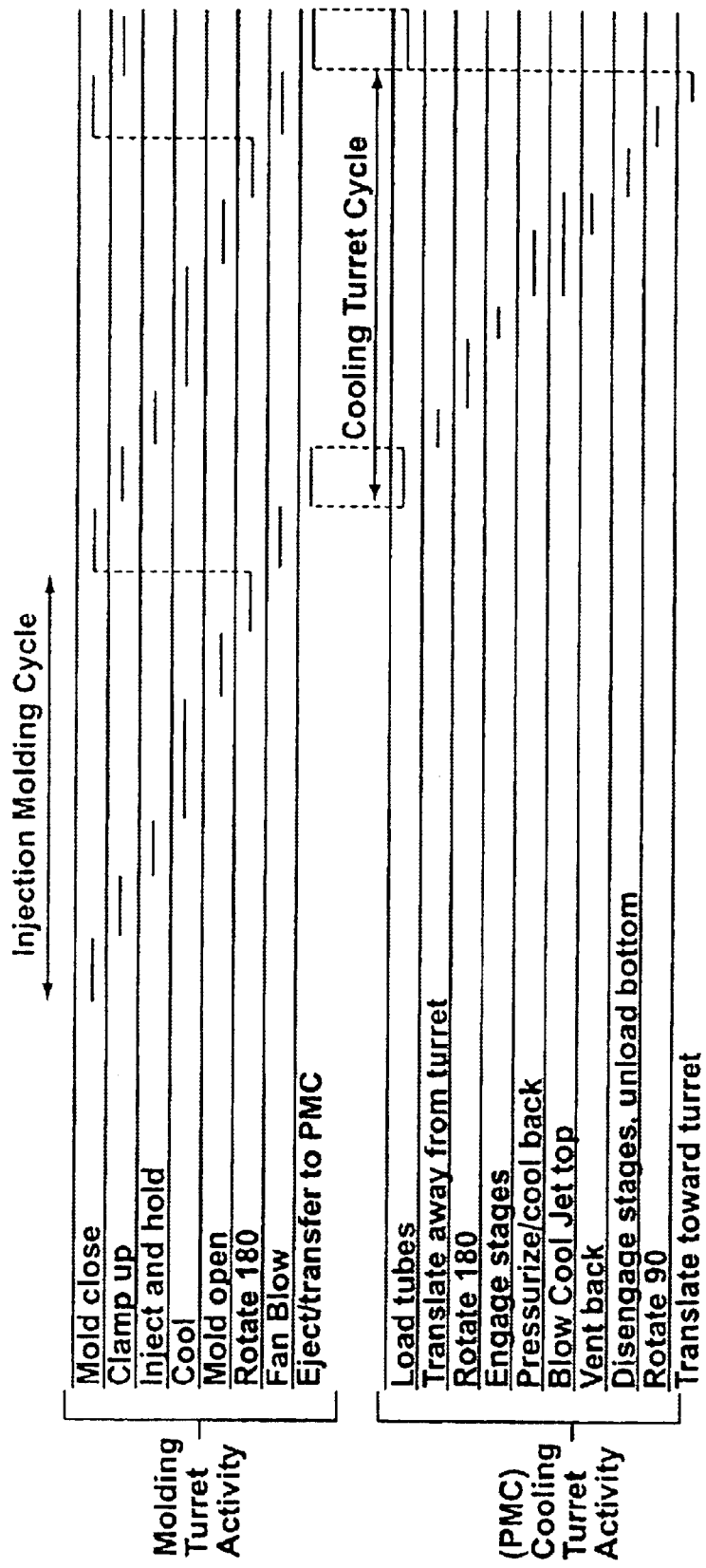
FIG. 17 comprises an alternate embodiment sequence chart for one of the operating sequences of an injection molding system in which a post mold cooling turret initially rotates 180 degrees and subsequently rotates in two further 90 degree increments.

FIG. 17 shows a sequence chart corresponding to the steps described above. The chart shows the relationship between the injection molding cycle and the post mold cooling turret cycle, and when the parts are transferred between them. In the sequence depicted, the post mold cooling turret 13 rotates 180 degrees after part transfer from the molding turret so that the freshly loaded parts can be immediately treated by conditioning station 22. This means that after this rotation, the turret must then rotate only 90 degrees to align the next empty receivers for part transfer.

Figure 18I:
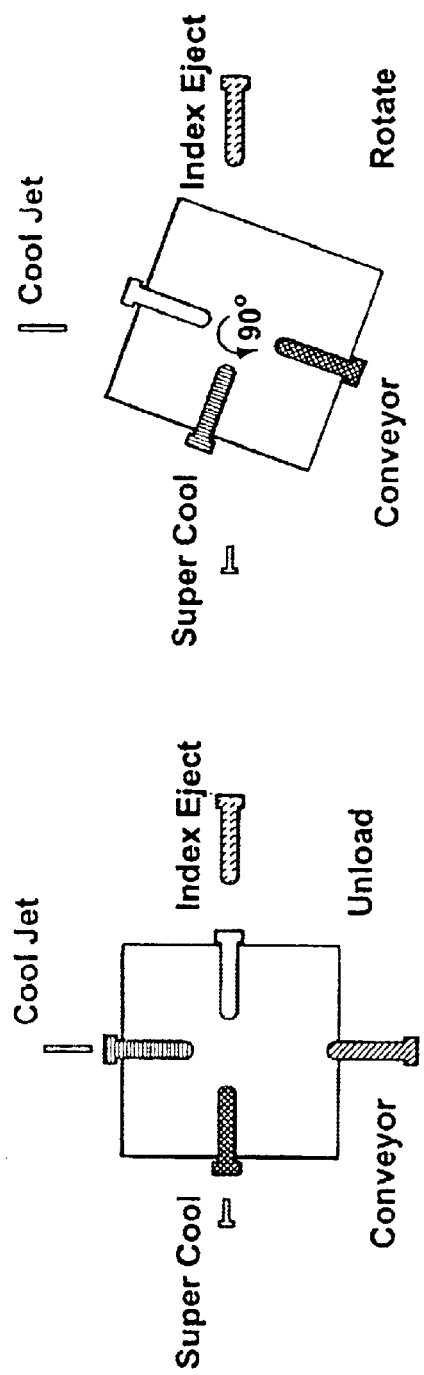
FIGS. 18a–18s comprise alternate embodiment charts representing the operating sequence for a post mold cooling turret, and the preforms it handles through one entire treatment cycle.
Figure 18J:
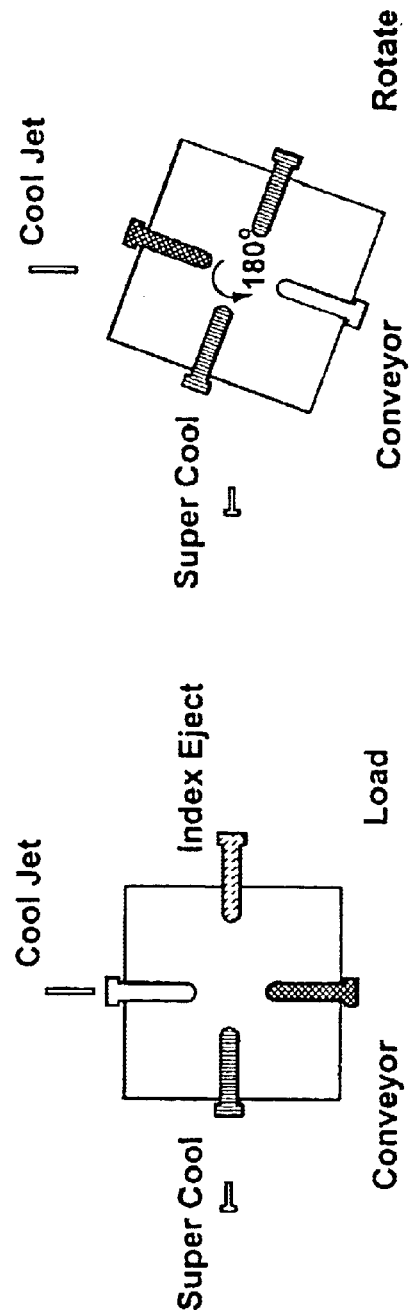
Figure 18K:
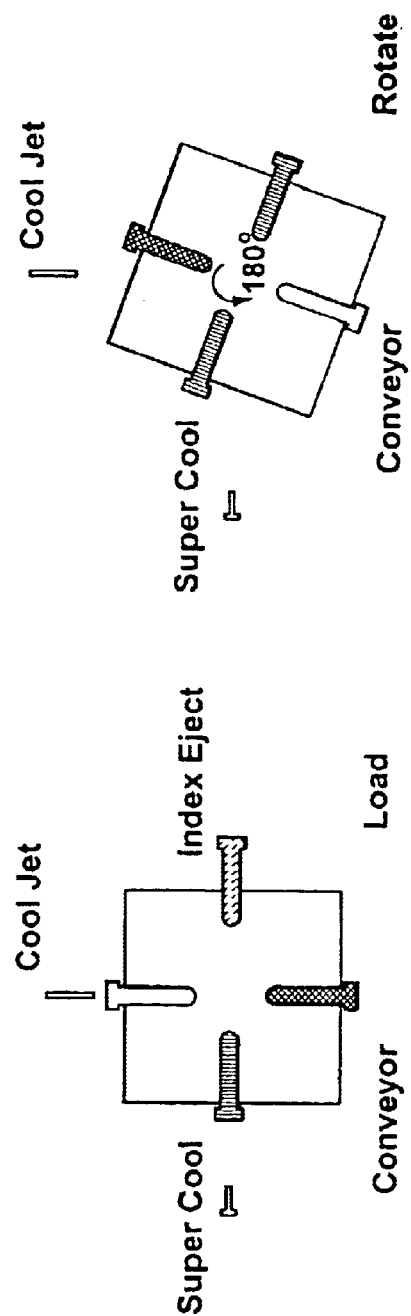
Figure 18L:
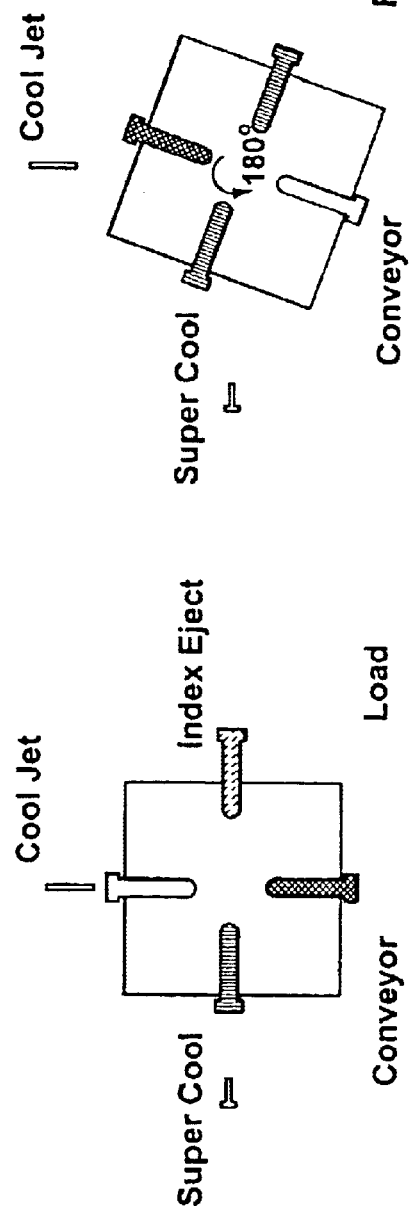

This sequence is more easily seen in FIGS. 18a–18s that illustrates each event that occurs on the post mold cooling turret means through its complete cycle. Conditioning station 22 is captioned "Super Cool" and conditioning station 20 is captioned "Cool Jet". Parts are ejected downward from the lowermost side of the turret and parts are loaded horizontally at the rightmost side of the turret. By following a preform of a particular number through the entire sequence, it becomes evident how the various treatments are applied in this particular sequence of operation.

Figure 19:
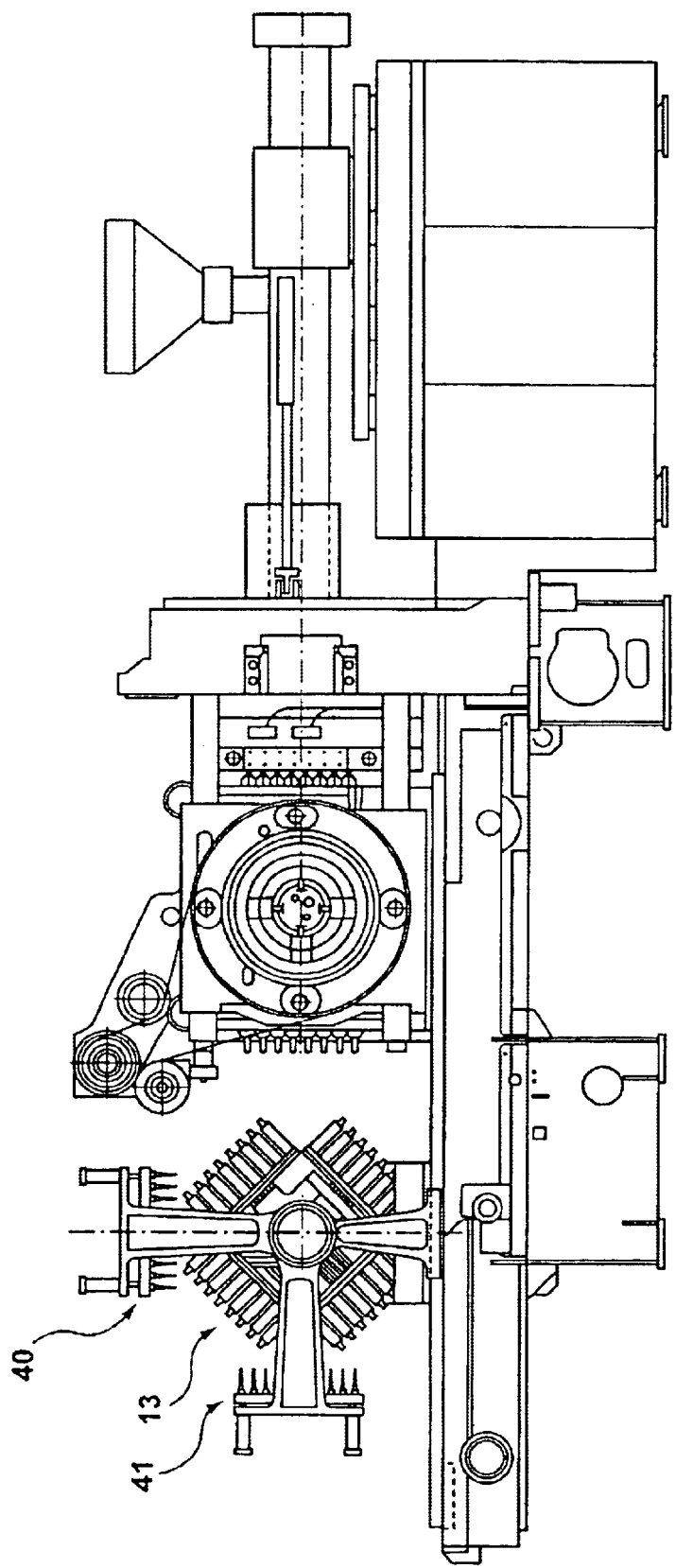
FIG. 19 comprises a side view of a preferred embodiment of an injection molding cooling apparatus showing a molding turret in a mold closed position and a post mold cooling turret rotating.

A preferred embodiment is shown in FIG. 19 in which two similar conditioning stations 40 and 41 are mounted on the post mold cooling turret carriage 15. This means that both stations can be engaged at any time that the post mold cooling turret 13 is not rotating, and obviates the need for the turret to be translated the full length of the base in order to engage a conditioning station mounted fixedly thereon. The two stations 40 and 41 both employ the cooling probe configuration described above and shown in FIGS. 5–6, thus allowing the same variety of processes to be applied in each conditioning station. This maximizes the post mold conditioning options available, and allows an optimum flexibility in processing a wide variety of different preform designs.

FIG. 20 shows a typical sequence chart of operations that may be employed using the FIG. 19 embodiment.

Testing has shown that cycle time savings of up to 2 seconds (about 15%) can be realized for preforms having wall thicknesses of 4.0 mm or greater. For example, a typical 0.5 L PET preform with a 4.00 mm wall can be molded conventionally using a side entry three-position carrier plate and robot at about a 17 second cycle. The same preform molded on an Index machine with a post mold cooling structure (turret) having four sets of receiver tubes only can be molded at about a 13 second cycle. The same preform can be molded on the preferred embodiment of this invention at about an 11 second cycle time.

1. Alternative Embodiments

Figure 22:
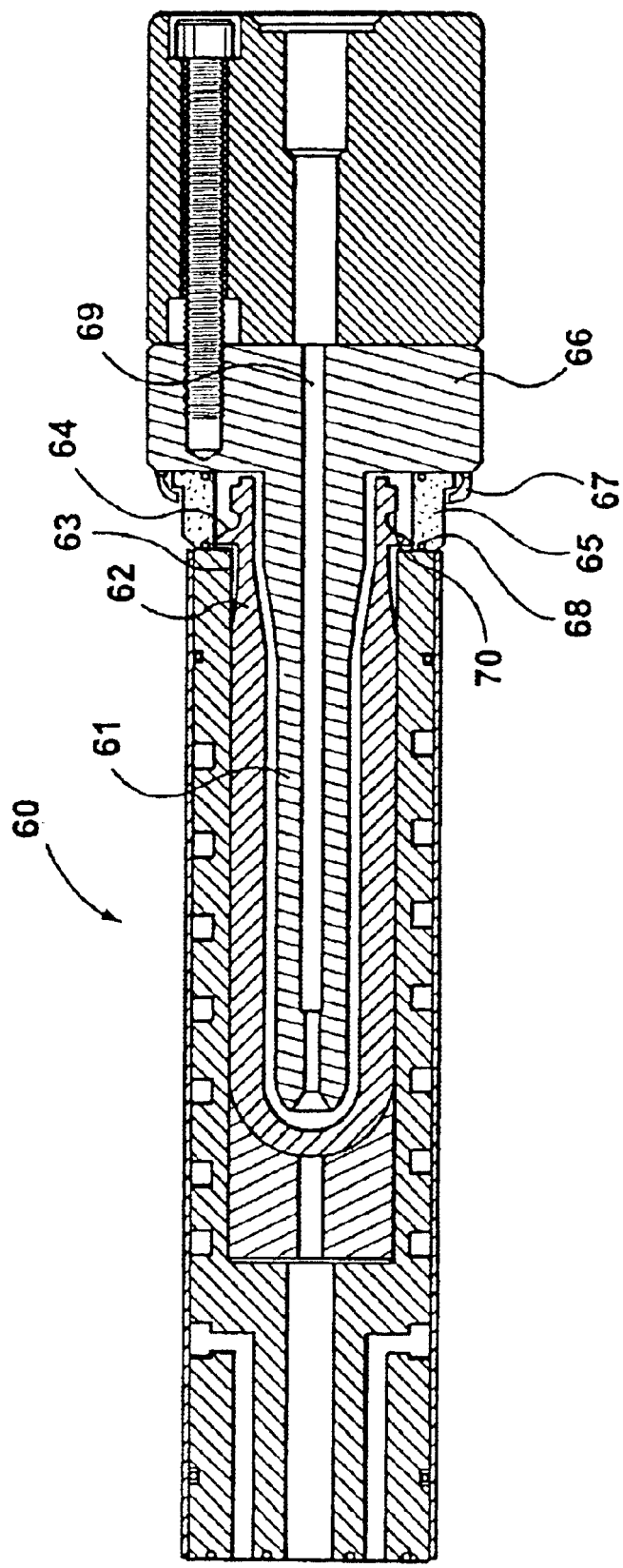
FIG. 22 comprises an alternate cooling tube embodiment with a blow pin and sealing annulus for negative draft preforms.
Figure 23:
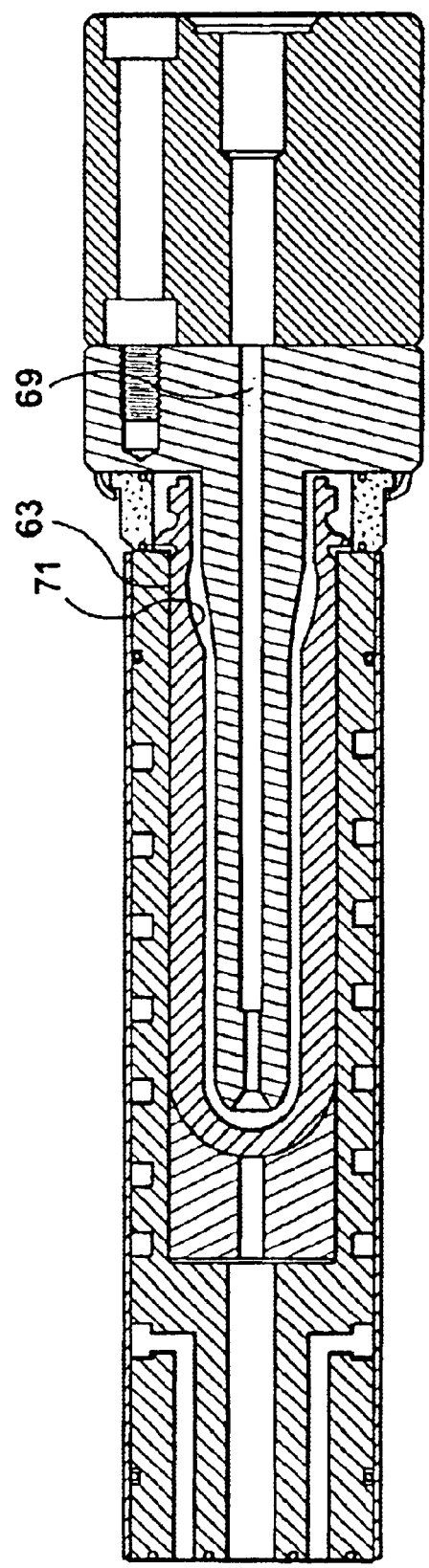
FIG. 23 comprises an alternate cooling tube embodiment with blow pin and sealing annulus for negative draft preforms showing preform shape modification.

FIGS. 22–24 Show an alternate embodiment in which a receiver tube 60 and a cooling pin 61 are provided for handling all preform types including "negative draft" preforms 62. Such a preform has a body diameter 63 that is reduced immediately adjacent the support ledge 64. This is in contrast to the preform designs shown in FIGS. 2–4.

The FIGS. 22–24 embodiment also shows a cooling pin 61 design that does not require a seal on the preform interior diameter in order to allow the interior space to be pressurized as described above. Instead, sealing collar 65 is attached to the cooling pin base 66 by fastening structure 67. The collar forms a seal at its interface with base 66 and also with the end of the receiver tube 60 by sealing structure 68. Thus, when cooling fluid is introduced via central channel 69, it will eventually flow completely over both inner and outer surfaces of the neck finish area 70 until pressure has built to the level that inhibits further flow.

FIG. 23 shows a situation that may occur with certain preform designs and operating conditions which produce a partly cooled preform such that when the cooling fluid is introduced via central channel 69, the preform body diameter is so soft that it is deformed outward until it touches the inner surface of the receiver tube 60, thereby producing a variation in the preform's inner surface 71. In some cases, this inner surface variation is acceptable and will allow the preform to be used to make an acceptable blown container.

Figure 24A:
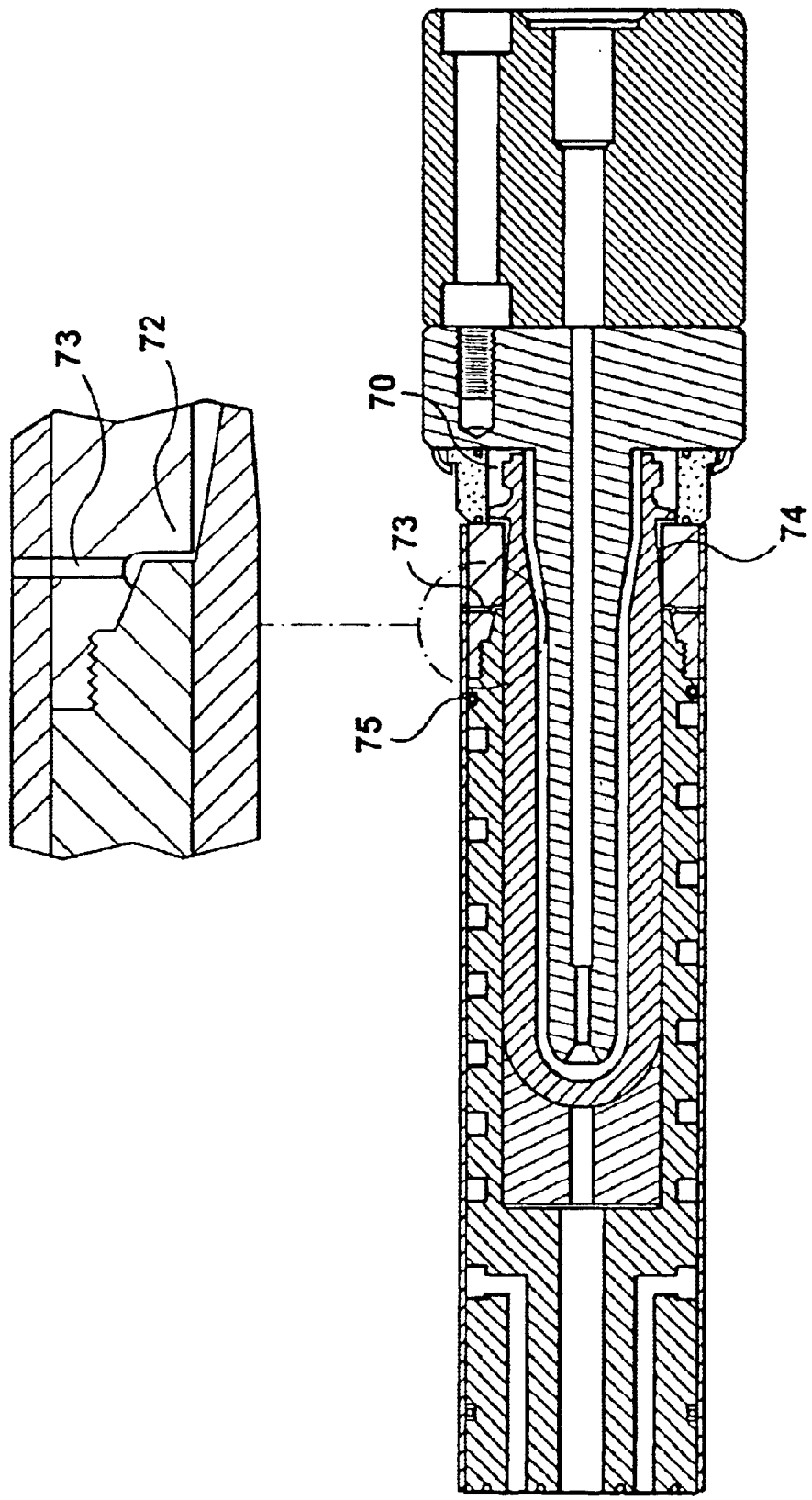
FIG. 24a comprises an alternate cooling tube embodiment with a blow pin and sealing annulus for negative draft preforms showing venting.

FIG. 24a shows an embodiment that provides a means to help alleviate the risk of such a preform inner surface variation from occurring. In this embodiment a venting annulus 72 and vent passage 73 are provided in the receiver tube wall adjacent the location where the preform's outer surface design makes the transition from an inwardly tapering surface 74 to a parallel or normally drafted surface 75. Venting the incoming cooling fluid at this location prevents a rapidly rising pressure from building up on the inside wall of the preform while still permitting some internal pressurizing and allowing the cooling fluid to circulate around both inner and outer surfaces of the neck finish area 70. he vent 72 is preferably 0.10–0.20 mm, but may be designed with any configuration to permit a controlled release of pressure. Likewise, the vent may have a valve structure to provide for a linear or non-linear release of pressure with a timing appropriate to the part being molded.

Figure 24B:
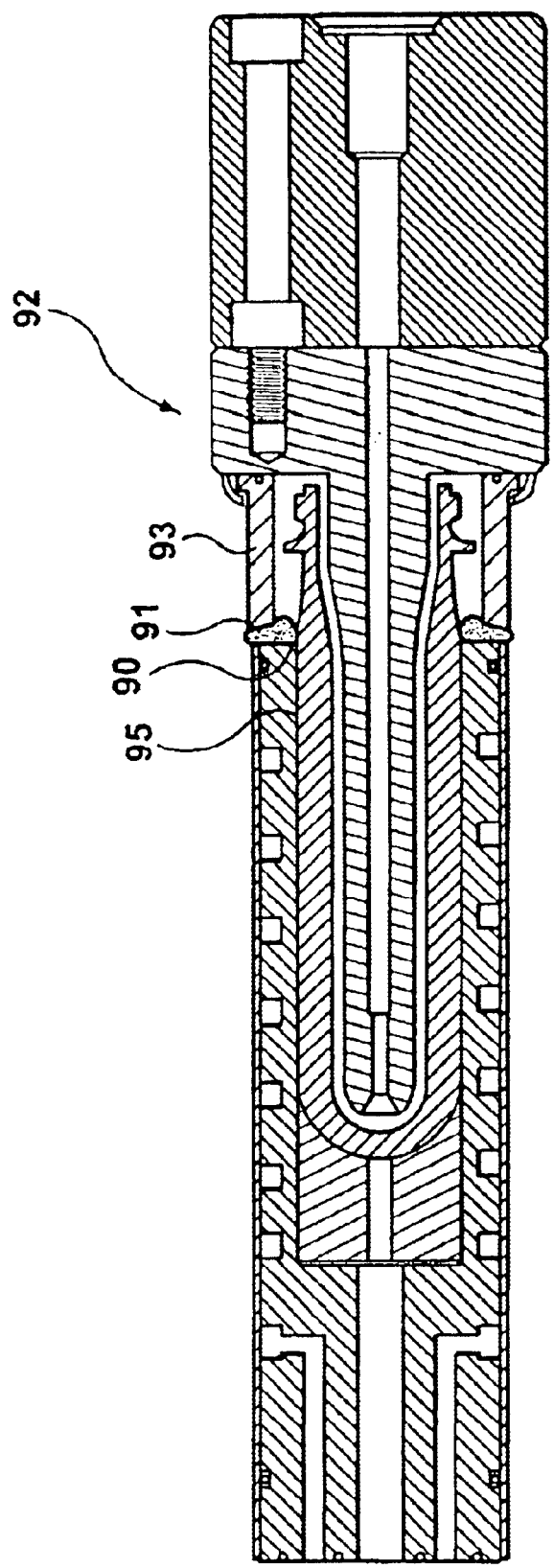
FIG. 24b comprises an alternate cooling tube embodiment with a blow pin and sealing annulus for negative draft preforms with a seal forming against the preform body.
Figure 24C:
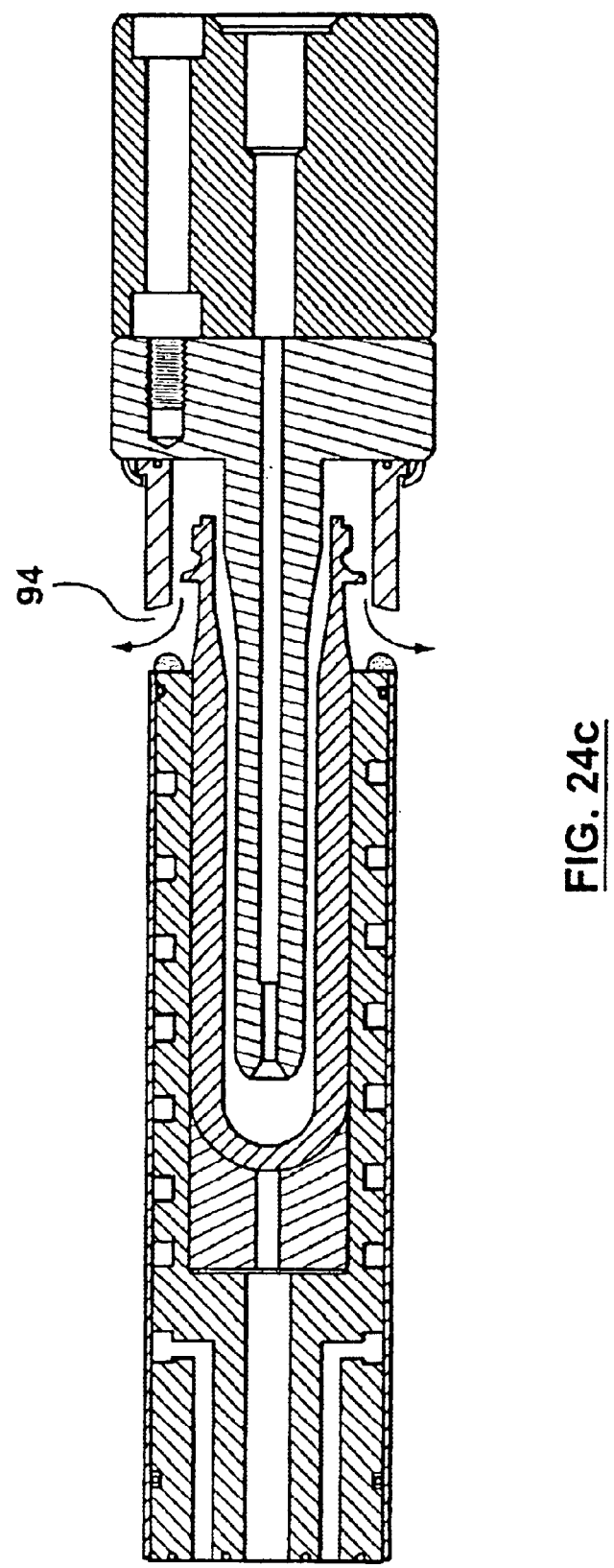
FIG. 24d shows an alternate sealing element configuration.
FIG. 24e shows a second alternate sealing element configuration.

FIGS. 24b and 24c show an embodiment in which a deformable seal 91 is attached to the end of the tube so that when the cooling pin assembly 92 is inserted to its fullest extent, the collar 93 causes the seal 91 to deform inwardly and contact and seal against the preform body itself. The deforming action is aided by means of the angled end wall 94 of the collar 93. The sealing against the preform body prevents pressurized cooling fluid from penetrating between the preform body and the inner wall of the receiver tube 95.

FIG. 24c shows the cooling pin assembly partially retracted thereby allowing the pressurized fluid inside the preform to vent to atmosphere, thus permitting fresh cooling fluid to enter the interior space from the channel 96 and continue the cooling action. An alternate variation in operation is to repeatedly engage and disengage the cooling pin assembly with the receiver tube to allow alternate pressurizing and venting of the interior space, and flushing of the cooling fluid. The ratio of engaged to disengaged times can vary from 10–90% of the period of time the preform is at this conditioning station.

Figure 25:
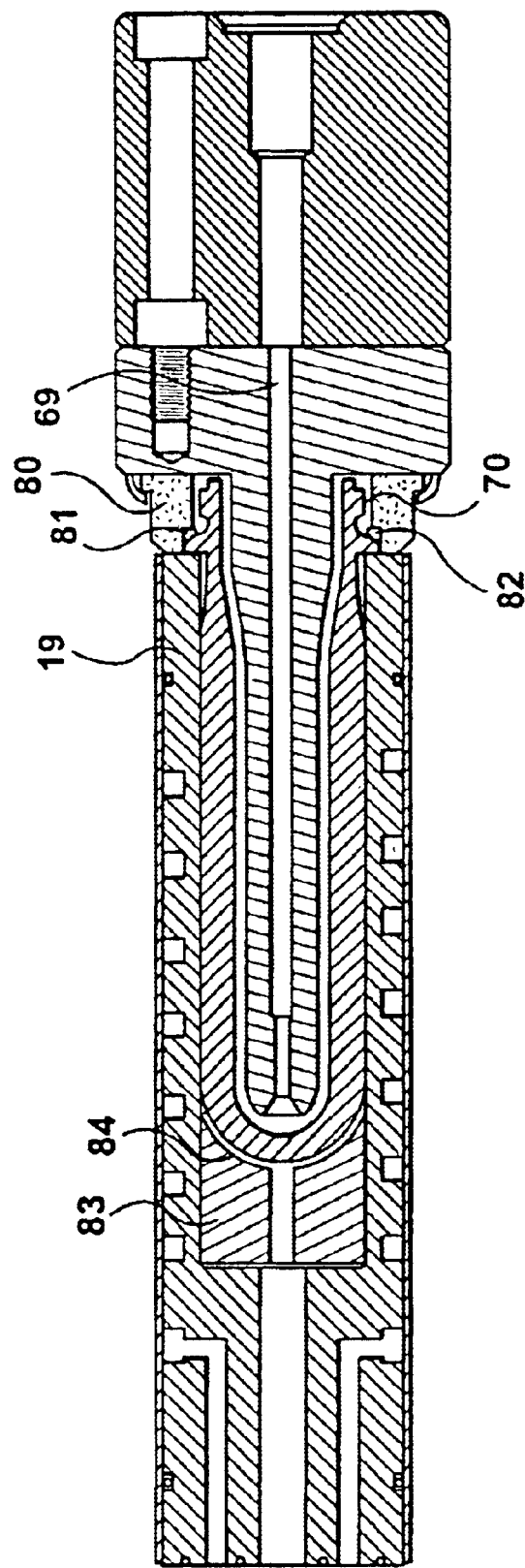
FIG. 25 comprises an alternate cooling tube embodiment with a blow pin and sealing annulus for sealing on a support ledge of the preform.

FIG. 25 shows an alternate embodiment of the receiving tube and cooling pin assembly. The molded partially cooled molded part is loaded into the receiving tube 19 until its support ledge feature 82 contacts the end of the receiving tube. The bottom cooling plug 83 in the receiving tube may not touch the loaded part at this point, so as to ensure the support ledge feature 82 is fully supported by the end of the receiving tube. A small clearance 84 may therefore exist between the end of the part and the plug 83.

Figure 24D:
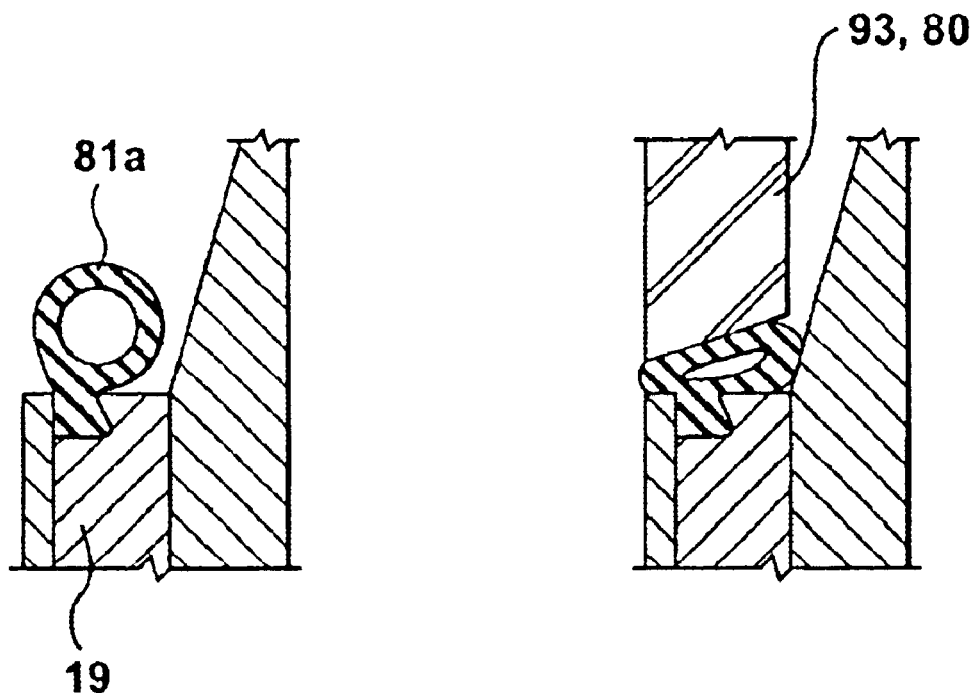
Figure 24E:
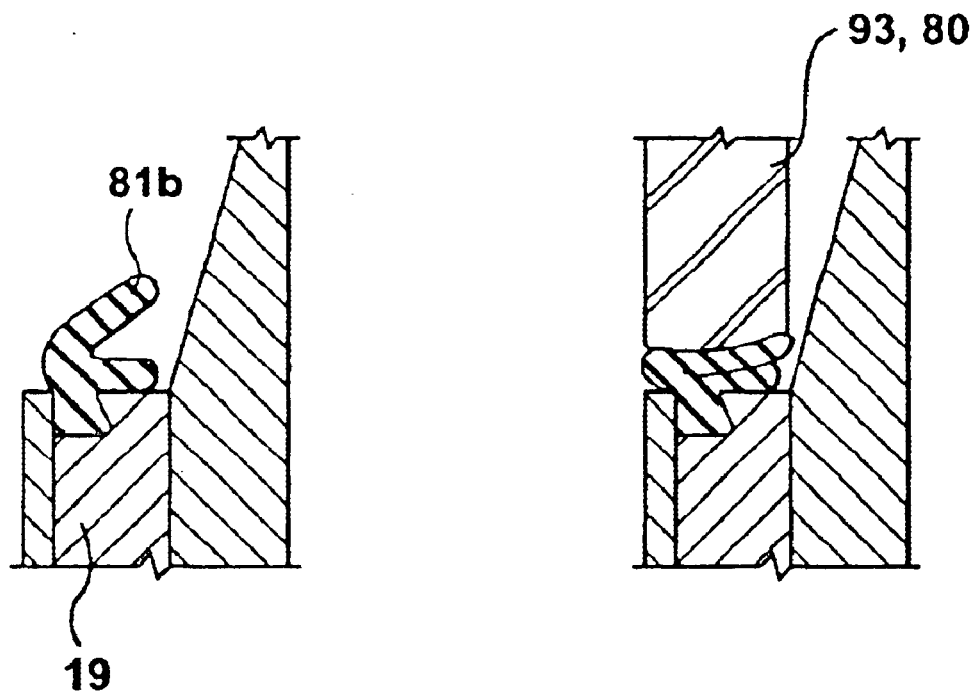

The sealing collar 80 contacts a sealing element 81 made of a suitably pliable material such as rubber or a soft elastomer such as NBR (acrylonitrile butadiene elastomer), that seals against the support ledge feature 82 of the molded part. The sealing element 81 also contacts the end of the receiving tube 19 after a predetermined amount of deflection of. the sealing element 81 has occurred, thereby preventing damage to the feature 82 of the molded part. Alternate sealing element 81 designs are shown in FIGS. 24d and 24e that are applicable in all the arrangements shown in FIGS. 22–25 inclusive. FIG. 24d shows a sealing element 81a having a hollow interior that allows it deform when contacted by another structure, or alternatively to be inflated by introducing pressurized fluid into the hollow section. FIG. 24e shows a sealing element 81b having a hinged configuration that when contacted deflects in a predictable and repeatable manner to seal against the molded part.

In operation, cooling fluid is introduced via cooling pin channel 69 so as to pressurize the interior of the part to ensure its outer surface maintains good contact with the inner surface of the receiving tube 19 as described above. With certain preform designs, or partially cooled conditions, this internal pressure may be sufficient to cause the length of the part to extend until the clearance 84 is eliminated and the closed end of the part is supported by the cooling plug 83, thereby further enhancing the cooling process. The cooling fluid contacts both inner and outer surfaces of the part's open end and provides a source of equal pressure on both surfaces thereby preventing any deformation or change in diameter of this neck finish area 70.

FIGS. 26–31 show and alternate embodiment where the post mold cooling devices are installed on a conventional horizontal injection molding machine having a multi-position take out plate equipped with cooling tubes.

U.S. Pat. No. Re. 33,237 (incorporated herein by reference) teaches a horizontal injection molding machine having a multi-position robot having a take out (or carrier) plate equipped with receiver tubes mounted thereon. The carrier plate has at least two sets of cavities therein for cooling the hollow plastic articles, with the number of cavities corresponding to a multiple of at least two times the number of hollow plastic articles produced in an injection molding cycle. The robot moves the carrier plate vertically to align one set of carrier plate cavities at a time to juxtapose each set of cavities with the hollow plastic articles formed in an injection molding cycle, and the hollow plastic articles are transferred to the juxtaposed cavities. By operating the carrier plate in this way, the hollow plastic articles can be stored in the carrier plate for the same number of cycles as there are sets of cavities in the carrier plate, thus providing sufficient additional cooling of the hollow plastic articles so that upon discharge they will not incur damage from further handling.

U.S. Pat. No. 6,171,541 (incorporated herein by reference) teaches inserting a cooling pin into the interior space of a partially cooled molded part that is held in a receiver tube, and injecting a cooling fluid therein. The patent also teaches inserting multiple pins into parts held in multiple tubes mounted on a multi-position carrier plate of the kind taught in the '237 patent above. The elongated cooling pins deliver a cooling fluid inside the molded articles held by the take-off plate. The cooling fluid is directed into the dome (sprue gate) portion of the preform. The cooling fluid is introduced so as to create an annular flow pattern. The cooling fluid is pressurized air delivered at through a channel located inside the cooling pin. The cooling pin is introduced deep inside the preform so that the cooling pin acts as an additional cooling core, and contributes to the creation of an annular flow pattern which has a higher cooling potential than other cooling flow patterns. Also, by using the cooling pin, the incoming blown cold air and outcoming warm air are completely separated and thus prevents mixing of the two. The cooling pin is positioned centrally within the preform, so that the central axis is aligned with the central axis of the preform. The outlet nozzle of the cooling pin is spaced from the inner wall of the dome portion by a distance d. In order to create the desired annular flow pattern of cooling fluid, it is preferred that the ratio of d:D be within the range of about 1:1 to about 10:1. It is also highly desirable that the outlet nozzle of the cooling pin be formed by a divergent nozzle construction. The cooling pins can have various sizes and shapes to achieve various cooling effects. The cooling pin may have lateral outlets for discharging a cooling fluid onto side walls of the molded article. The cooling pin 74 could have helical grooves to obtain specialized cooling effects. Similarly, the cooling pin could have a plurality of ribs spaced about its periphery or a plurality of contact elements.

Figure 26:
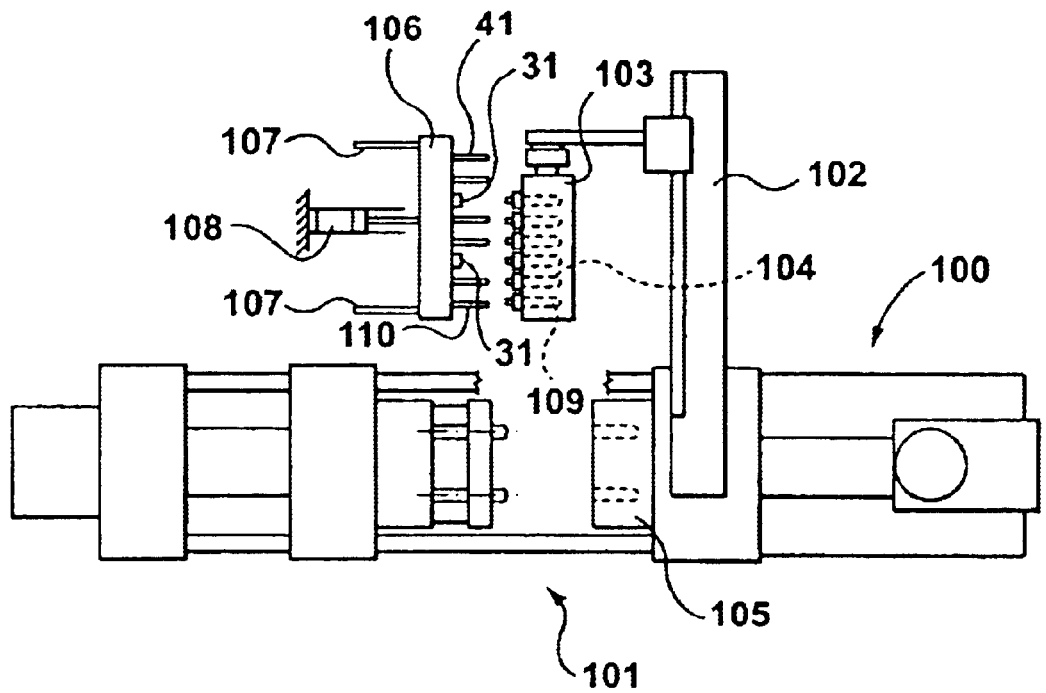
FIG. 26 comprises an alternate embodiment including a horizontal injection molding machine and a multi-position take out robot with cooling tubes, shown in a first position.

FIG. 26 shows a plan view of a horizontal injection molding machine 100 and mold 101 and multi-position robot 102 having a take out plate 103 equipped with receiver tubes 104. There are three receiver tubes 103 for each mold cavity 105. The take out plate 103 is shown at its innermost of its three outboard positions. Post mold cooling devices are shown mounted to movable plate 106. The plate 106 can move toward and away from the take out plate 103 guided on rails 107 and moved by cylinder 108. Mounted on plate 106 are plugs 31 of the type shown above in FIG. 2, and in sufficient quantity and layout to match mold cavities 105. Also mounted on the plate 106 are cooling pins 41 of the type shown in FIG. 4 and in sufficient quantity and layout to match two sets of mold cavities 105.

Figure 29:
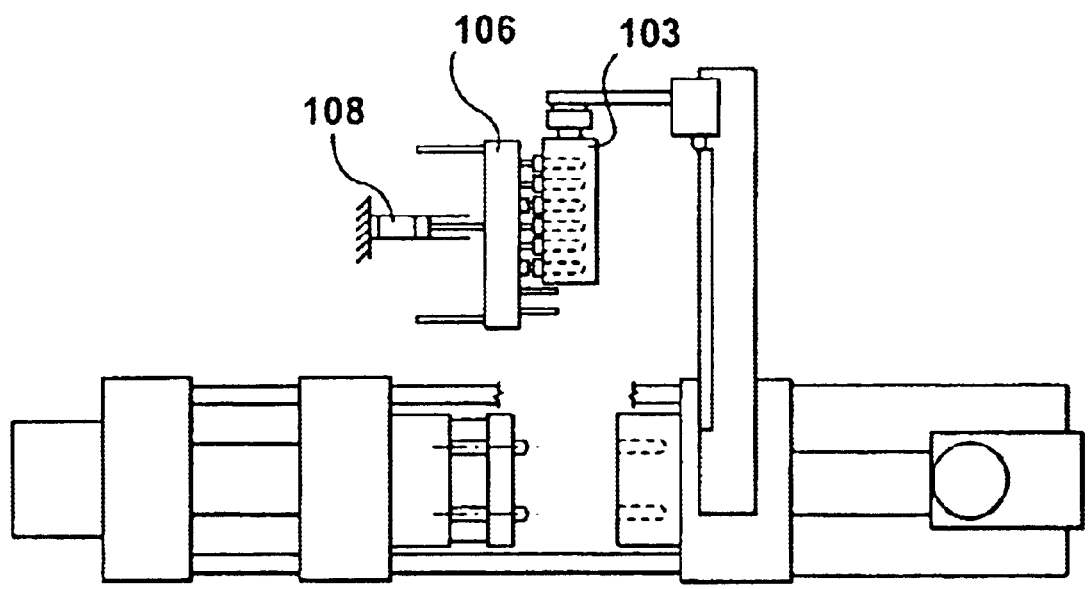
FIG. 29 comprises an alternate embodiment including a horizontal injection molding machine and a multi-position take out robot with cooling tubes, shown in a third position with a treatment device engaged.
Figure 30:
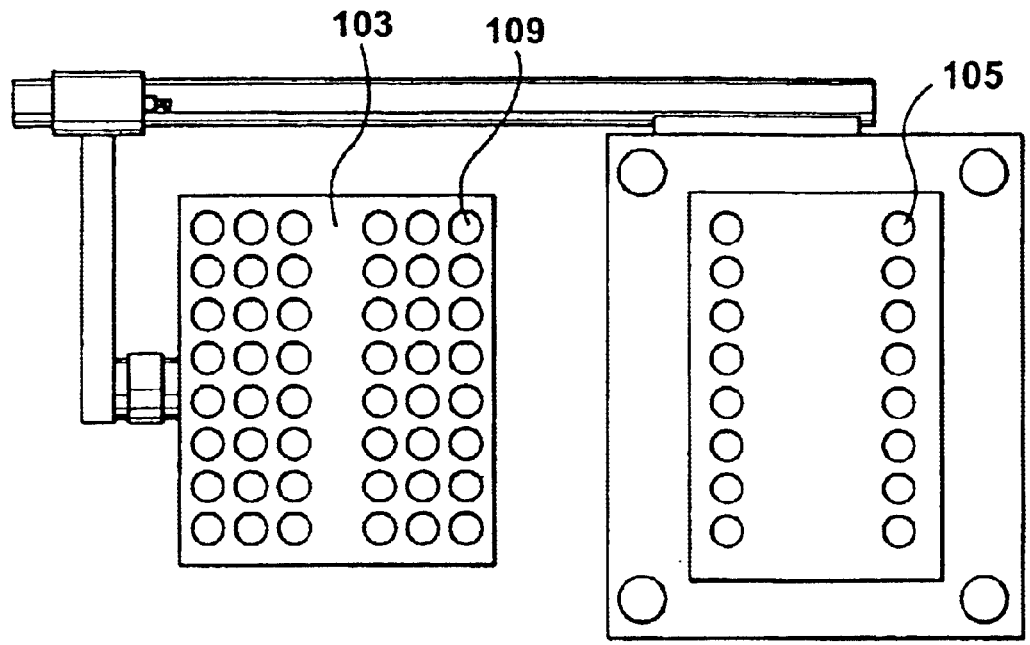
FIG. 30 comprises an alternate embodiment including a horizontal injection molding machine and a multi-position take out robot with cooling tubes, showing the cavity dispositions.

FIG. 26 shows the carrier plate 103 at its innermost position having its innermost receiving tube 109 aligned with the innermost cooling pin 110, such that when cylinder 108 is energized plate 106 moves the plugs and pins into engagement with the parts in the tubes on carrier plate 103. FIG. 29 shows this engagement however with plate 103 in its outermost position.

Once engaged, the plugs 31 allow the parts in their engaged receiver tubes to be pressurized as described above. Simultaneously, engaged pins 41 provide fluid cooling to the parts in their respective tubes, those parts having previously been pressurized by plugs 31 in an earlier cycle.

Figure 31:
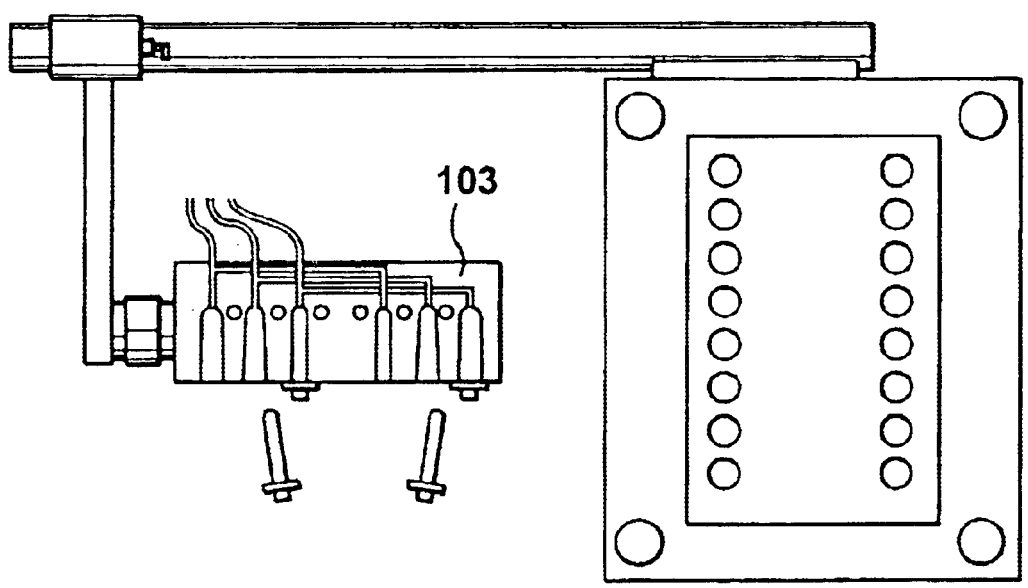
FIG. 31 comprises an alternate embodiment including a horizontal injection molding machine and a multi-position take out robot with cooling tubes, showing the take out plate rotated into the ejection position.
Figure 32E:
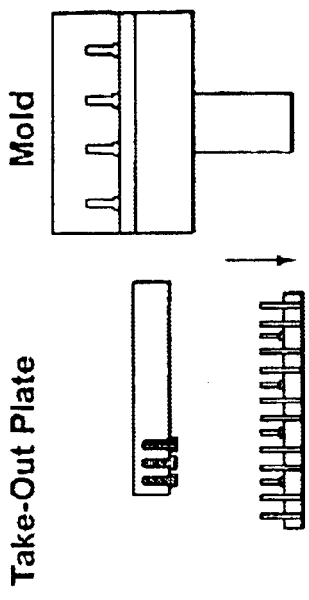
Figure 32F:
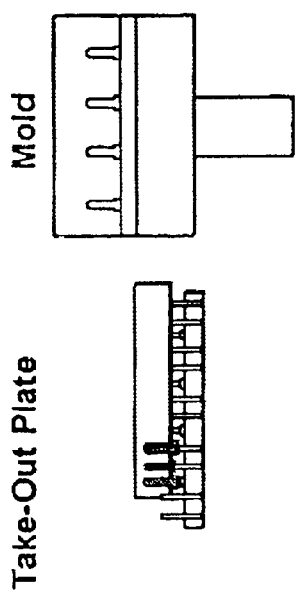
Figure 32G:
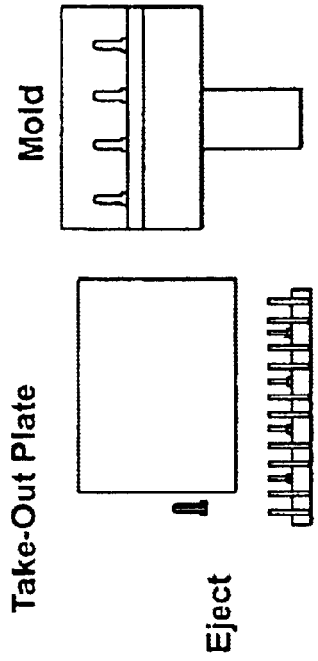
Figure 32H:
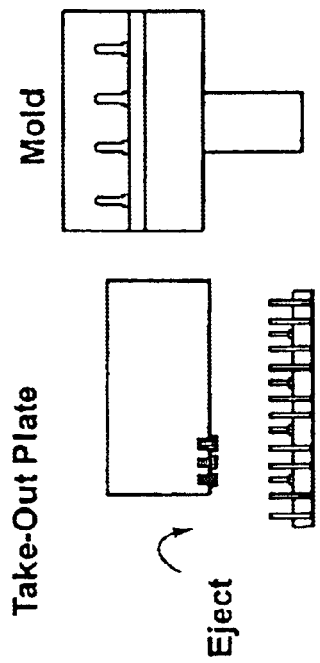
Figure 32I:
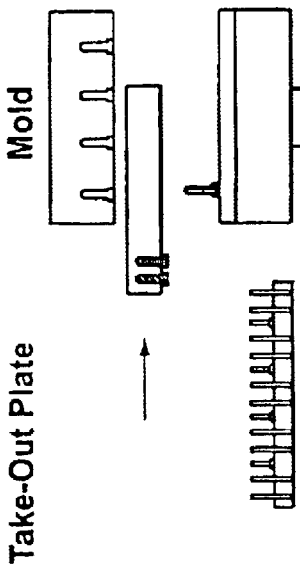
Figure 32J:
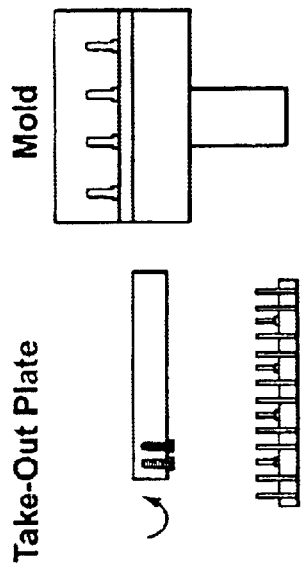
Figure 32L:
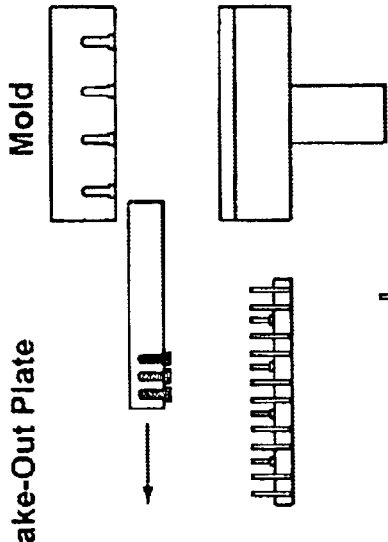
Figure 32K:
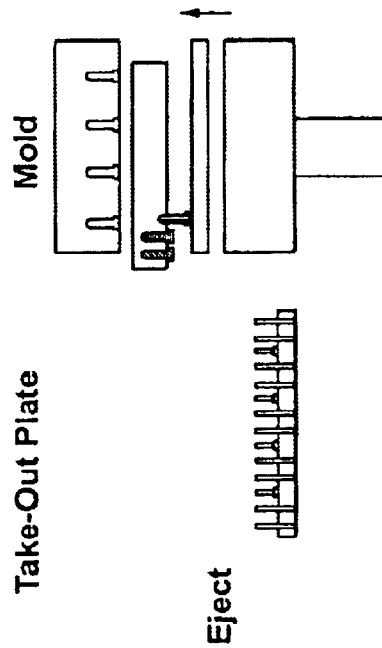

After a prescribed time has elapsed, cylinder 108 is energized to retract plate 106, thereby providing clearance and allowing the carrier plate 103 to be rotated 90 degrees to the ejection position, as shown in FIG. 31, whereupon those parts selected for ejection are removed from their respective receiver tubes. The carrier plate 103 is then rotated 90 degrees in the reverse direction to restore its previous alignment ready for entry into the mold area to collect the next molded set of parts in its vacant set of receiver tubes.

Figure 27:
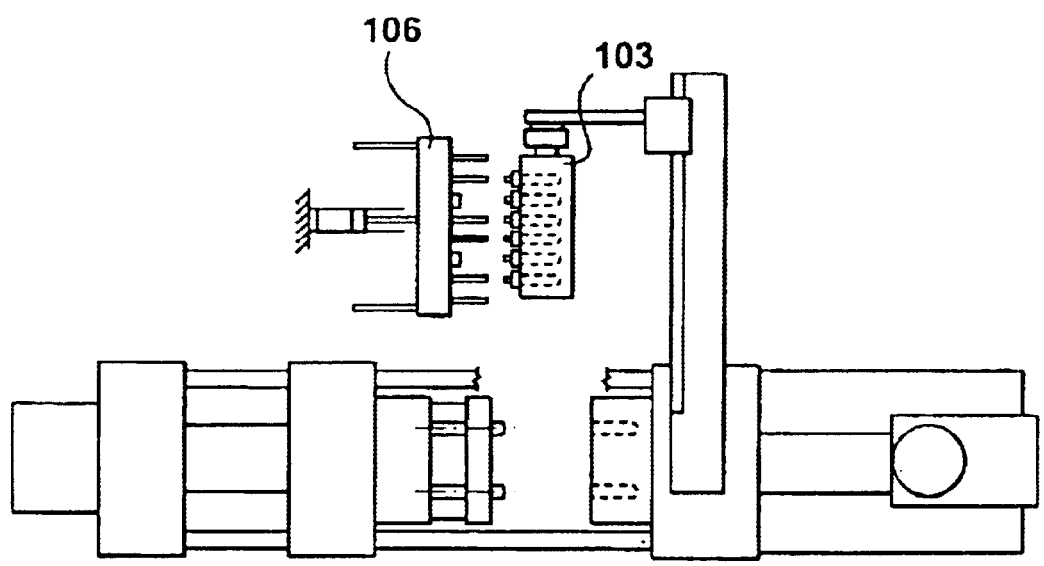
FIG. 27 comprises an alternate embodiment including a horizontal injection molding machine and a multi-position take out robot with cooling tubes, shown in a second position.
Figure 28:
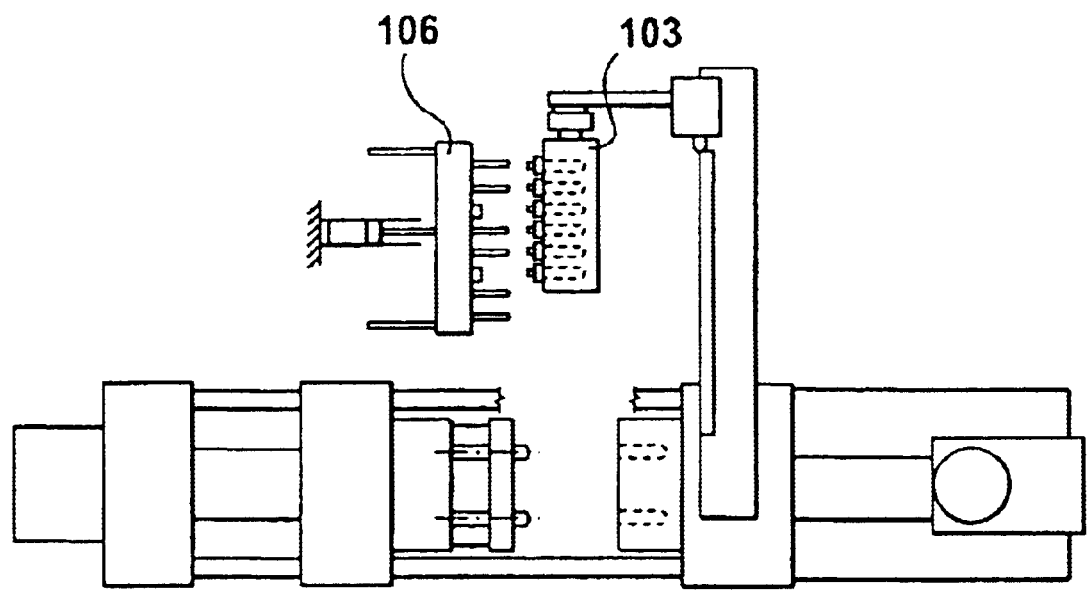
FIG. 28 comprises an alternate embodiment including a horizontal injection molding machine and a multi-position take out robot with cooling tubes, shown in a third position.

FIG. 27 shows the carrier plate 103 at its midposition in the outboard state, and FIG. 28 shows the carrier plate 103 at its outermost position. At each of these three outboard positions, the carrier plate 103 is aligned with the plugs and pins on plate 106, so that during three successive molding cycles, the parts carried in the receiver tubes are sequentially engaged with first a plug 31 for pressurizing and thereafter with two pins 41 for cooling, prior to the parts being ejected.

The sequence is more easily seen in FIGS. 31a–32l that illustrate events that occur through one molding cycle. Plug 31 is captioned "Super Cool" and cooling pin 41 is captioned "Cool Jet".

The design of the mounting interface of the plugs 31 and pins 41 to the plate 106 is preferably the same so that they can be interchanged. For example, a configuration that uses two sets of plugs and one set of pins could be assembled, thereby allowing the parts to receive two cycles of pressurized cooling prior to a single cycle of pin cooling fluid delivery. Certain part designs and wall thickness variations may advantageously utilize such a configuration. Similarly, all the pins and plugs on plate 106 can be replaced by the combination probes shown in FIGS. 5–6 or FIGS. 22–25 as described above. This would provide greater flexibility in operation.

Additional flexibility in post mold treatment can be provided by installing two, three, or more sets of receiver tubes on plate 103, the number depending on the spacing of cavities 105 in the injection mold. Similarly various combinations of plugs, pins, or combination probes can be provided on plate 106 to further extend the variations of treatment that can be provided by them.

1. Advantageous Features

Advantageous features according to the preferred embodiments include:

A post mold cooling turret that carries one or more conditioning stations, which engages the parts held in receiver tubes.

A conditioning station that includes a CoolJet probe combined with a pressure sealing plug that can be controlled to seal or release.

A receiving tube and cooling probe combination that does not require the tube to seal on the inner surface of the preform, while providing means to pressurize the preform interior to enhance heat transfer by maintaining contact between substantially most of the preform's outer surface and the inner surface of the receiving means.

A preform that has a locally deformed surface portion adjacent the support ledge, formed in the receiving tube that is acceptable for producing finished containers.

A receiving tube venting structure for inhibiting rapid pressure build up within the preform interior while still providing adequate means to circulate the cooling fluid.

A process that first pressurizes the preform to ensure conductive cooling, followed by release of this pressure, followed by a supply of cooling fluid that flushes out the heated fluid previously used for pressurizing. Such cycles may be repeated and one or more stations, with the same or different timings for each cycle.

A process that allows a period of time to elapse during the post mold cooling sequence to allow heat to migrate from the inner wall area of the preform to its surface, to be removed by both inner and outer cooling means applied at the optimum locations.

An Index molding system that minimizes tooling required for the high speed production of plastic parts by providing a post mold cooling device that uses minimal components that require customizing to suit the part being molded.

1. Conclusion

Thus, what has been described is a method and apparatus for efficiently cooling molded plastic pieces with reduced cycle time and cost.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Cooling apparatus for a molded plastic part, comprising:

a receiving tube which receives the plastic part such that an open end of the plastic part is exposed, said receiving tube being in contact with an outside surface of the plastic part;

a cooling pin which is inserted through the open end of the plastic part into an interior thereof, and capable if injecting a cooling fluid therein; and a pressure seal coupled between said receiving tube and said cooling pin to maintain a pressure inside the plastic part higher than ambient pressure, said pressure seal being configured to permit fluid communication between the inside of the plastic part and a portion of the outside of the plastic part.

2. Cooling apparatus for a plastic preform, comprising:

a receiving tube which receives the plastic preform such that an open end of the plastic preform is exposed, said receiving tube being in contact with an outside surface of the plastic preform;

a cooling pin which is inserted through the open end of the plastic preform into an interior thereof, and capable of injecting a cooling fluid therein;

a pressure seal coupled between said receiving tube and said cooling pin to maintain a pressure inside the plastic preform higher than ambient pressure; and a vent in said receiving tube to permit fluid communication between the inside of the plastic preform and an outside of said receiving tube.

3. Apparatus for cooling a molded plastic part, comprising:
- a receiver cavity configured to hold the plastic part such that an opening in the plastic part is exposed;
- a cooling fluid provider configured to provide a cooling fluid to an inside portion of the plastic part through the opening in the plastic part;
- a pressure seal configured to provide a pressure seal between the inside of the plastic part and ambient pressure;
- a controller configured to control said cooling fluid provider and said pressure seal to cause:
  - (i) said pressure seal to provide the pressure seal and said cooling fluid provider to provide the cooling fluid such that a higher than ambient pressure is maintained on the inside portion of the plastic part;
  - (ii) said pressure seal to release the pressure seal such that the pressure inside the plastic part is reduced; and
  - (iii) said cooling fluid provider to provide further cooling fluid after said pressure seal releases the pressure seal such that the further cooling fluid flushes the inside of the plastic part.

4. Apparatus according to claim 3, wherein said controller is further configured to control said cooling fluid provider and said pressure seal to cause:
- (iv) said pressure seal to again provide the pressure seal and said cooling fluid provider to again provide the cooling fluid such that a higher than ambient pressure is maintained on the inside portion of the plastic part.

5. Apparatus according to claim 4, wherein said controller is further configured to cause (ii) through (iv) a plurality of times.

6. Apparatus according to claim 3, wherein the plastic part comprises a plastic preform.

* * * * *